(12) United States Patent
Wilberding et al.

(10) Patent No.: US 12,175,161 B2
(45) Date of Patent: Dec. 24, 2024

(54) GENERATIVE AUDIO PLAYBACK VIA WEARABLE PLAYBACK DEVICES

(71) Applicant: Sonos, Inc., Santa Barbara, CA (US)

(72) Inventors: Dayn Wilberding, Portland, OR (US); Adam Kumpf, Delaware, OH (US); Ryan Michael Bello, Sammamish, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/636,089

(22) Filed: Apr. 15, 2024

(65) Prior Publication Data

US 2024/0256217 A1     Aug. 1, 2024

Related U.S. Application Data

(63) Continuation of application No. PCT/US2023/074840, filed on Sep. 22, 2023.

(60) Provisional application No. 63/377,776, filed on Sep. 30, 2022.

(51) Int. Cl.
*G01H 11/06*     (2006.01)
*G06F 3/16*     (2006.01)

(52) U.S. Cl.
CPC .................. *G06F 3/165* (2013.01)

(58) Field of Classification Search
CPC ..... A61B 5/1112; A61B 5/0205; G01H 11/06; G06F 1/1626; G06F 1/1694; G06F 3/165; G06F 1/163; G10K 11/17837; G10K 11/17855; H04L 63/0861; H04N 7/165; H04N 21/43615; H04R 1/1041; H04R 1/1091; H04R 11/00; H04R 27/00; H04R 1/1025; H04R 1/1075; H04R 1/1083; H04R 5/033; H04R 5/04; H04S 1/005; H04S 7/303; H04S 7/304; H04S 7/308; H04W 12/033; H04W 8/00; G02B 27/017
See application file for complete search history.

(56) References Cited

U.S. PATENT DOCUMENTS

| | | | |
|---|---|---|---|
| 4,626,904 A * | 12/1986 | Lurie | H04N 7/165 348/E7.063 |
| 5,440,644 A | 8/1995 | Farinelli et al. | |
| 5,761,320 A | 6/1998 | Farinelli et al. | |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Gerald Gauthier
(74) *Attorney, Agent, or Firm* — Fortem IP LLP

(57) ABSTRACT

Systems and methods for playback of generative media content via wearable audio playback devices such as headphones are disclosed. In one method, the wearable device detects that it is being worn by a user, and obtains one or more input parameters via a network interface. Next, generative media content is generated based on the one or more input parameters and played back via the wearable playback device. In some examples, after detecting that the wearable playback device is no longer being worn by the user, playback ceases.

23 Claims, 20 Drawing Sheets

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 8,977,376 B1* | 3/2015 | Lin | G01H 11/06 |
| | | | 381/326 |
| 11,736,850 B1* | 8/2023 | Liu | H04R 1/1091 |
| | | | 381/370 |
| 11,743,675 B2* | 8/2023 | Beckhardt | H04N 21/43615 |
| | | | 700/94 |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2015/0025662 A1* | 1/2015 | Di Censo | G06F 3/165 |
| | | | 700/94 |
| 2015/0084902 A1* | 3/2015 | Atsumi | G06F 1/1626 |
| | | | 345/173 |
| 2015/0168996 A1* | 6/2015 | Sharpe | H04L 63/0861 |
| | | | 455/66.1 |
| 2015/0371529 A1* | 12/2015 | Dolecki | G06F 1/1694 |
| | | | 700/94 |
| 2016/0118062 A1* | 4/2016 | Usher | G06F 3/165 |
| | | | 704/225 |
| 2016/0198251 A1* | 7/2016 | Pan | H04R 1/1041 |
| | | | 381/74 |
| 2017/0280223 A1* | 9/2017 | Cavarra | G06F 1/1694 |
| 2018/0359553 A1* | 12/2018 | Mizuuchi | G10K 11/17837 |
| 2019/0104366 A1* | 4/2019 | Johnson | H04R 5/04 |
| 2019/0258452 A1* | 8/2019 | Yamada | G06F 3/165 |
| 2019/0278552 A1* | 9/2019 | Lyren | H04S 7/303 |
| 2020/0112810 A1* | 4/2020 | Young | H04S 1/005 |
| 2020/0314527 A1* | 10/2020 | Guo | H04R 11/00 |
| 2022/0159402 A1* | 5/2022 | Magariyachi | H04S 7/304 |
| 2022/0232340 A1* | 7/2022 | Laaksonen | H04S 7/304 |
| 2022/0295183 A1* | 9/2022 | Chen | H04R 1/1091 |
| 2022/0322024 A1* | 10/2022 | Subramanian | H04R 5/033 |
| 2023/0060353 A1* | 3/2023 | Gandhi | G10K 11/17855 |
| 2023/0107691 A1* | 4/2023 | Barnacka | A61B 5/0205 |
| | | | 600/484 |
| 2023/0108506 A1* | 4/2023 | Wilberding | H04R 27/00 |
| | | | 381/77 |
| 2023/0112041 A1* | 4/2023 | Niehaus | A61B 5/1112 |
| | | | 434/247 |
| 2023/0176211 A1* | 6/2023 | Lin | G06F 3/165 |
| | | | 381/380 |
| 2023/0283940 A1* | 9/2023 | Fan | H04R 1/1075 |
| | | | 381/74 |
| 2023/0300250 A1* | 9/2023 | Delaney | H04N 7/152 |
| | | | 370/260 |
| 2023/0308806 A1* | 9/2023 | Wu | H04R 1/1041 |
| 2023/0328419 A1* | 10/2023 | Karp | H04R 1/1025 |
| | | | 381/380 |
| 2023/0333850 A1* | 10/2023 | Liu | G06F 1/163 |
| 2023/0337302 A1* | 10/2023 | Kim | H04W 8/00 |
| 2023/0362544 A1* | 11/2023 | Shi | G02B 27/017 |
| 2024/0048972 A1* | 2/2024 | Karkera | H04W 12/033 |
| 2024/0056762 A1* | 2/2024 | Lian | H04R 5/033 |
| 2024/0064449 A1* | 2/2024 | Tao | H04R 1/08 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings*, DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

| Reference Number | Label |
|---|---|
| 230 | housing |
| 232 | control area |
| 234 | top portion |
| 236a | button |
| 236b | button |
| 236c | button |
| 236d | button |

| Reference Number | Label |
|---|---|
| 240 | housing |
| 242 | control area |
| 244 | top portion |
| 246 | dock |
| 248 | cable |
| 250 | housing |
| 252 | headband |
| 254a-b | earpieces |
| 256a-b | cushions |
| 258 | control area |

| Reference Number | Label |
|---|---|
| 260 | housing |
| 262 | in-ear portion |
| 264 | over-ear portion |
| 266 | control areas |

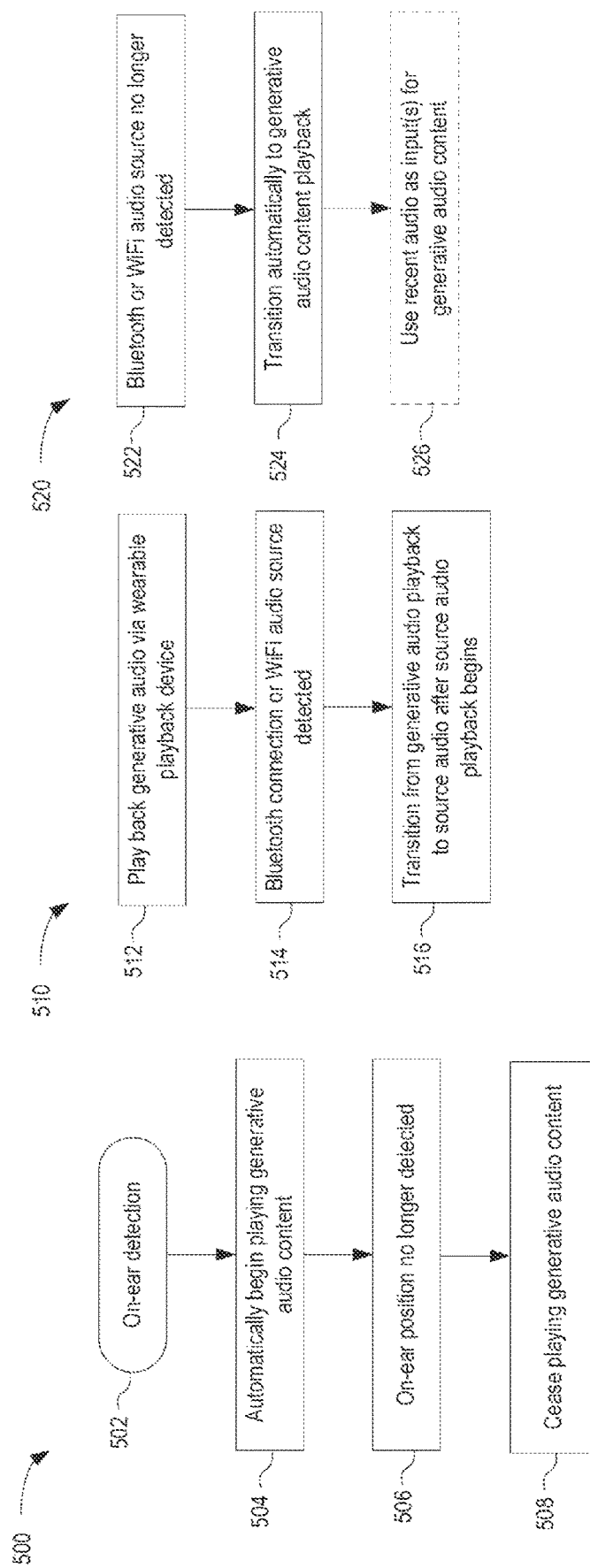

| Reference Number | Label |
|---|---|
| 530 | method |
| 540 | wearable device |
| 542 | second wearable playback device |
| 544 | out-loud playback device |
| 546 | out-loud playback device |
| 548 | out-loud playback device |

| Reference Number | Label |
|---|---|
| 901-905 | various locations |

| Room | User 1 | User 2 |
|---|---|---|
| Patio | Y | Y |
| Bedroom 2 | N | Y |
| Entry Den | Y | Y |
| Bath 2 | N | N |
| Kitchen/Dining | Y | Y |
| Living | Y | Y |
| Bathroom 1 | Y | N |
| Bath 1 | Y | N |

GENERATIVE AUDIO PLAYBACK VIA WEARABLE PLAYBACK DEVICES

CROSS-REFERENCE TO RELATED APPLICATIONS

This application is a continuation of International Patent Application No. PCT/US2023/074840, filed Sep. 22, 2023, which claims the benefit of priority to U.S. Patent Application No. 63/377,776, filed Sep. 30, 2022, each of which is hereby incorporated by reference in its entirety.

TECHNICAL FIELD

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIGS. 5A-5D illustrate example methods for generative audio playback via a wearable audio playback device in accordance with aspects of the disclosure.

Figure 1A:
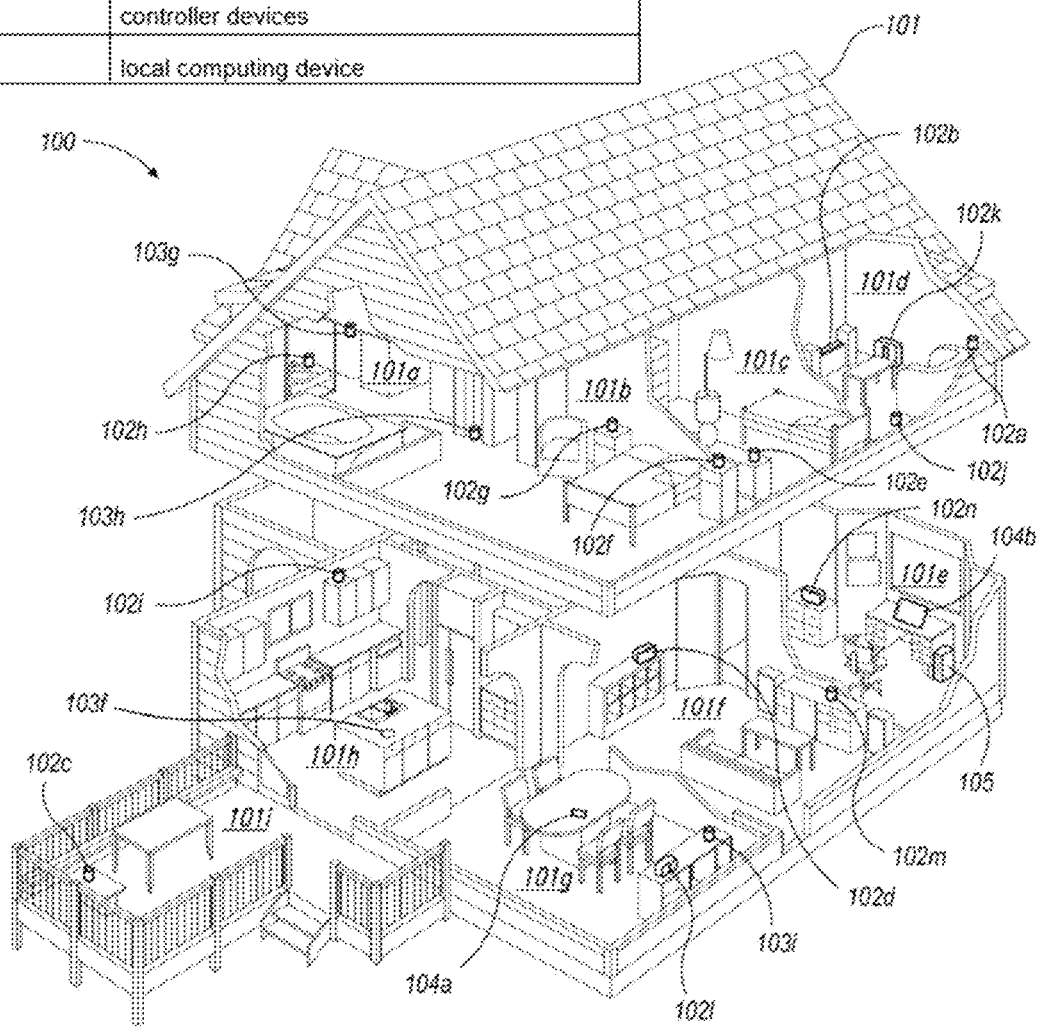
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103*a* is first introduced and discussed with reference to FIG. 1A.

DETAILED DESCRIPTION

I. Overview

Generative media content is content that is dynamically synthesized, created, and/or modified based on an algorithm, whether implemented in software or a physical model. The generative media content can change over time based on the algorithm alone or in conjunction with contextual data (e.g., user sensor data, environmental sensor data, occurrence data). In various examples, such generative media content can include generative audio (e.g., music, ambient soundscapes, etc.), generative visual imagery (e.g., abstract visual designs that dynamically change shape, color, etc.), or any other suitable media content or combination thereof. As explained elsewhere herein, generative audio can be created at least in part via an algorithm and/or non-human system that utilizes a rule-based calculation to produce novel audio content.

Because generative media content can be dynamically modified in real-time, it enables unique user experiences that are not available using conventional media playback of pre-recorded content. For example, generative audio can be endless and/or dynamic audio that is varied as inputs (e.g., input parameters associated with user input, sensor data, media source data, or any other suitable input data) to the algorithm change. In some examples, generative audio can be used to direct a user's mood toward a desired emotional state, with one or more characteristics of the generative audio varying in response to real-time measurements reflective of the user's emotional state. As used in examples of the present technology, the system can provide generative audio based on the current and/or desired emotional states of a user, based on a user's activity level, based on the number of users present within an environment, or any other suitable input parameter.

Listening to audio content—whether generative audio or pre-existing audio—via a wearable playback device (e.g., headphones, earphones) typically requires that the wearable playback device be tethered or connected to another device, such as a smartphone, tablet, laptop, etc. Certain wearable playback devices (e.g., WiFi-capable devices) may not need to be tethered to another local device, but still may require that the user affirmatively initiate audio playback (e.g., via a voice command). In some instances, it would be desirable for a listener to use a wearable device untethered to another device with playback capable of initiating automatically and, optionally, responsive to the contextual data (e.g., data relating to the listener's environment).

The present technology relates to wearable playback devices configured to play back generative media content, and to intelligently control such playback based on contextual data. For example, a wearable playback device can detect engagement of at least one of the user's ears (e.g., headphone is detected over one ear, or an earphone is placed in at least one of the user's ears, etc.) and automatically initiate playback of a soundscape (e.g., generative audio, media content, other sounds such as sounds related to the user's environment). The generative audio soundscape may include a generative music composition based at least in part on one or more media content stems and/or audio cues derived from contextual data. The contextual data may include information relating to the user's environment (e.g., location, position or orientation with respect to the environment, time of day, temperature, circadian rhythm, humidity, number of persons in proximity, ambient light levels) or other types of indicators (e.g., doorbells, alarms, events). In some implementations, certain other indicators (e.g., doorbells, alarms, etc.) can be selectively passed through to the wearable playback device to notify that user while the user remains within the immersive audio experience. Moreover, in general audio captured in the environment can serve as an input to generative media algorithms, and in some instances the output of the generative media algorithm can itself serve as an input to a future iteration of generative media content (i.e., resampling).

In various examples, the contextual data can be obtained via on-board sensor(s) carried by the wearable playback device, sensor(s) associated with other playback devices within the environment, or any other suitable sensor data source. In certain examples, the wearable playback device can identify the user when the playback device is placed on the user's head, and the wearable playback device may further tailor the generative media content to the user's profile, current or desired emotional state, and/or other biometric data (e.g., brainwave activity, heart rate, respiratory rate, skin moisture content, ear shape, head direction or orientation). Moreover, in some instances playback of generative audio content can dynamically swap or toggle between playing via a wearable playback device and playing alternatively or concurrently via one or more out-loud playback devices within the listening environment.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
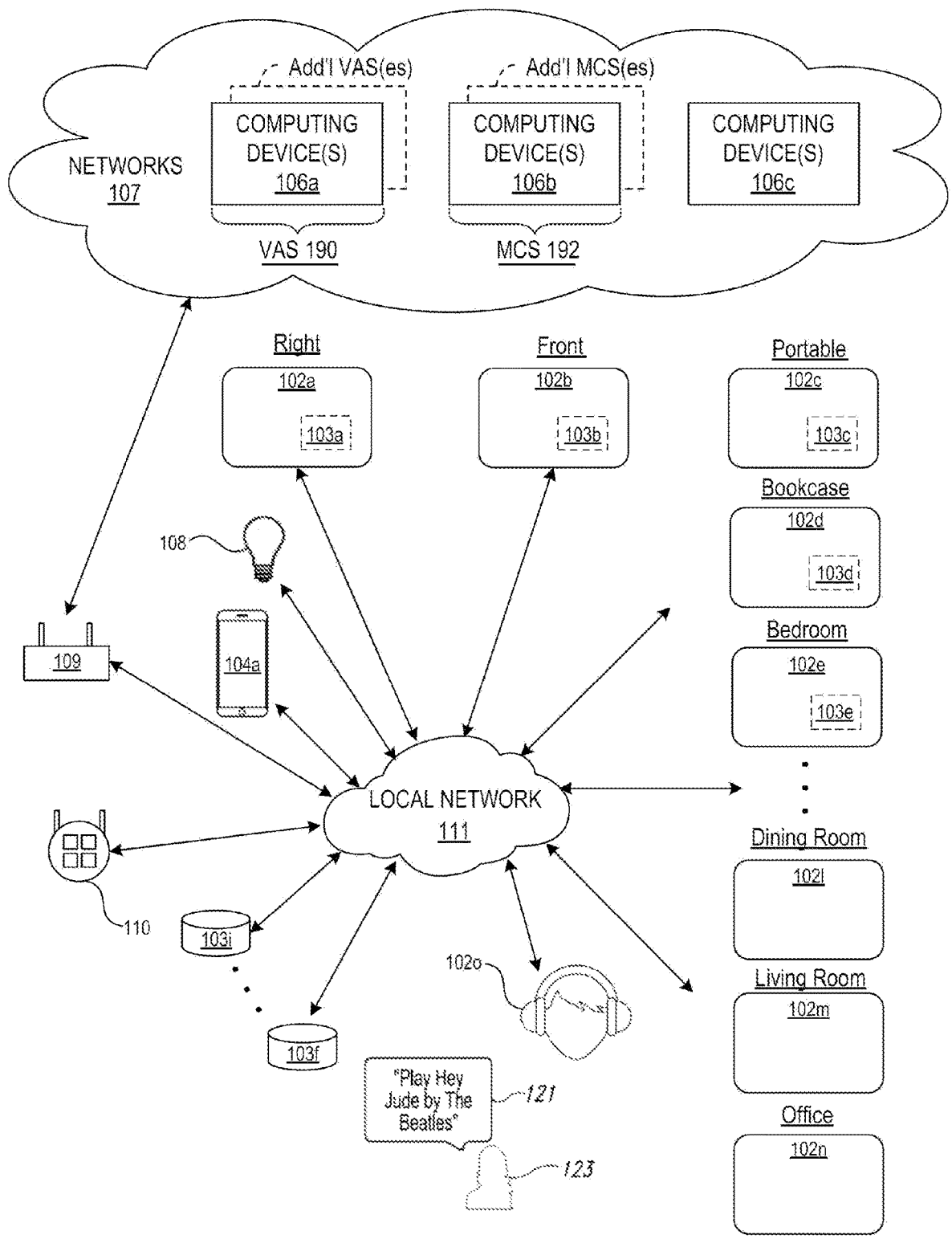
FIG. 1B is a schematic diagram of the media playback system of FIG. 1A and one or more networks.
Figure 1C:
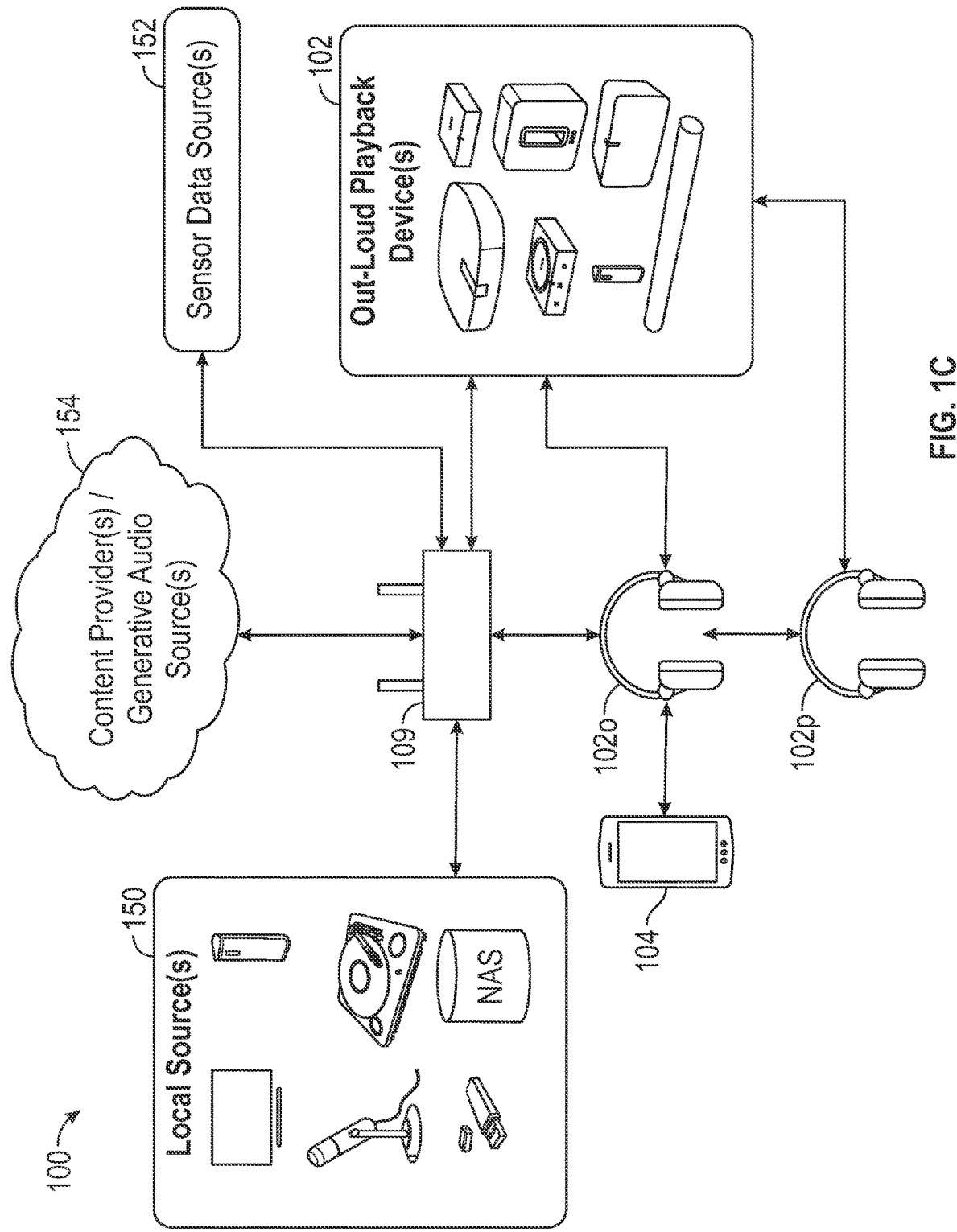
FIG. 1C is a schematic diagram of the media playback system of FIGS. 1A and 1B including wearable playback devices for playing back generative audio content.

FIGS. 1A-1C illustrate example configurations of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A-1C together, such computing devices can include playback devices 102 (identified individually as playback devices 102a-102p), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like. Additionally, one or more of the various playback devices 102 can be configured as wearable playback devices (e.g., playback devices configured to be worn on, by, or about a user, such as headphones, earphones, smart glasses with integrated audio transducers, etc.). Playback devices 102o and 102p (FIG. 1C) are examples of wearable playback devices. In contrast to wearable playback devices, one or more of the various playback devices 102 can be configured as out-loud playback devices (e.g., playback devices configured to output audio content for listeners spaced some distance from the playback device and/or for multiple users, as opposed to the private listening experience associated with wearable playback devices).

With reference to FIG. 1B, the various playback, network microphone, and controller devices 102-104 and/or other network devices of the MPS 100 may be coupled to one another via point-to-point connections and/or over other connections, which may be wired and/or wireless, via a local network 111 that may include a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area network (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice assistant service ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS.

Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

With respect to FIG. 1C, the media playback system 100 can be configured to produce and play back generative media content via one or more wearable playback devices 102o, 102p and/or via one or more out-loud playback devices 102. In the illustrated example, the wearable playback devices 102o, 102p each take the form of headphones, although any suitable wearable playback device can be used. The out-loud playback device(s) 102 can include any suitable device configured to cause output of audio content for out-loud listening in the environment. Some out-loud playback devices include integrated audio transducers (e.g., a soundbar, a subwoofer), while others may include amplifiers configured to provide output signals to be played back via other devices (e.g., a hub device, set-top box, etc.).

The various communication links illustrated in FIG. 1C can be wired or wireless network connections, which can be facilitated at least in part via router 109. Wireless connections can include WiFi, Bluetooth, or any other suitable communication protocol. As illustrated, one or more local source(s) 150 can be connected over a network (e.g., via router 109) to the wearable playback device 102o, and the out-loud playback devices 102. The local source(s) 150 can include any suitable media and/or audio sources, such as display devices (e.g., televisions, projectors, etc.), microphones, analog playback devices (e.g., a turntable), portable data storage devices (e.g., USB stick), computer storage (e.g., hard drive of a laptop computer), etc. These local source(s) 150 can optionally provide audio content to be played back via the wearable playback devices 102o, 102p, and/or the out-loud playback device(s) 102. In some examples, media content obtained from the local source(s) 150 can provide inputs to a generative media module, such that the resulting generative media content is based on and/or incorporates features of the media content from the local source(s) 150.

The first wearable playback device 102o can be communicatively coupled to a control device 104 (e.g., a smartphone, tablet, laptop, etc.), for example via a WiFi, Bluetooth, or other suitable wireless connection. The control device 104 can be used to select content and/or otherwise control playback of audio via the wearable playback device 102o and/or any additional playback devices 102.

The first wearable playback device 102o is also optionally connected to the local area network via router 109 (e.g., via a WiFi connection). A second wearable playback device 102p can be connected to the first wearable playback device 102o via a direct wireless connection (e.g., Bluetooth) and/or via a wireless network (e.g., WiFi connection via the router 109). The wearable playback devices 102o, 102p may communicate with one another to transfer audio content, timing information, sensor data, generative media content parameters (e.g., content models, algorithms, etc.), or any other suitable information to facilitate the production, selection, and/or playback of audio content. The second wearable playback device 102p can also optionally be connected to one or more of the out-loud playback devices via a wireless connection (e.g., Bluetooth or WiFi connection to a hub device).

The media playback system 100 can also be in communication with one or more remote computing devices 154 that are associated with media content provider(s) and/or generative audio source(s). These remote computing devices 154 can provide media content, optionally including generative media content. As described in more detail elsewhere herein, in some instances generative media content can be produced via one or more generative media modules, which can be instantiated via remote computing devices 154, via one or more of the playback devices 102, and/or some combination thereof.

The generative media modules can produce generative media based at least in part on input parameters, which may include sensor data (e.g., as received from sensor data source(s) 152) and/or other suitable input parameters. With respect to sensor input parameters, the sensor data source(s) 152 can include data from any suitable sensor, wherever located with respect to the various playback devices and whatever values are measured thereby. Examples of suitable sensor data includes physiological sensor data such as data obtained from biometric sensors, wearable sensors, etc. Such data can include physiological parameters like heart rate, breathing rate, blood pressure, brainwaves, activity levels, movement, body temperature, etc.

Suitable sensors include wearable sensors configured to worn or carried by a user, such as a wearable playback device, a headset, watch, mobile device, brain-machine interface, microphone, or other similar device. In some examples, the sensor can be a non-wearable sensor or fixed to a stationary structure. The sensor can provide the sensor data, which can include data corresponding to, for example, brain activity, user mood or emotional state, voice, location, movement, heart rate, pulse, body temperature, and/or perspiration.

In some examples, the sensor data source(s) 152 include data obtained from networked device sensor data (e.g., Internet-of-Things (IoT) sensors such as networked lights, cameras, temperature sensors, thermostats, presence detectors, microphones, etc.). Additionally or alternatively, the sensor data source(s) 152 can include environmental sensors (e.g., measuring or indicating weather, temperature, time/day/week/month), as well as user calendar events, proximity to other electronic devices, historical usage patterns, blockchains or other distributed data sources, etc.

In one example, a user can wear a biometric device that can measure various biometric parameters, such as heart rate or blood pressure, of the user. The generative media module (whether residing at remote computing devices 154 or one or more local playback devices 102) can use these parameters to further adapt the generative audio, such as by increasing the tempo of the music in response to detecting a high heart rate (as this may indicate that the user is engaging in a high motion activity) or decreasing the tempo of the music in response to detecting a high blood pressure (as this may indicate that the user is stressed and could benefit from calming music). In yet another example, one or more microphones of a playback device can detect a user's voice. The captured voice data can then be processed to determine, for example, a user's mood, age, or gender, to identify a particular user from among several users within a household, or any other such input parameter. Other examples are possible as well.

Additional details regarding production and playback of generative media content can be found in commonly owned International Patent Application Publication No. WO2022/109556, titled "Playback of Generative Media Content," which is hereby incorporated by reference in its entirety.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of the local network 111.

While specific implementations of MPSs have been described above with respect to FIGS. 1A-1C, there are numerous configurations of MPSs, including, but not limited to, those that do not interact with remote services, systems that do not include controllers, and/or any other configuration as appropriate to the requirements of a given application.

a. Example Playback & Network Microphone Devices

Figure 2A:
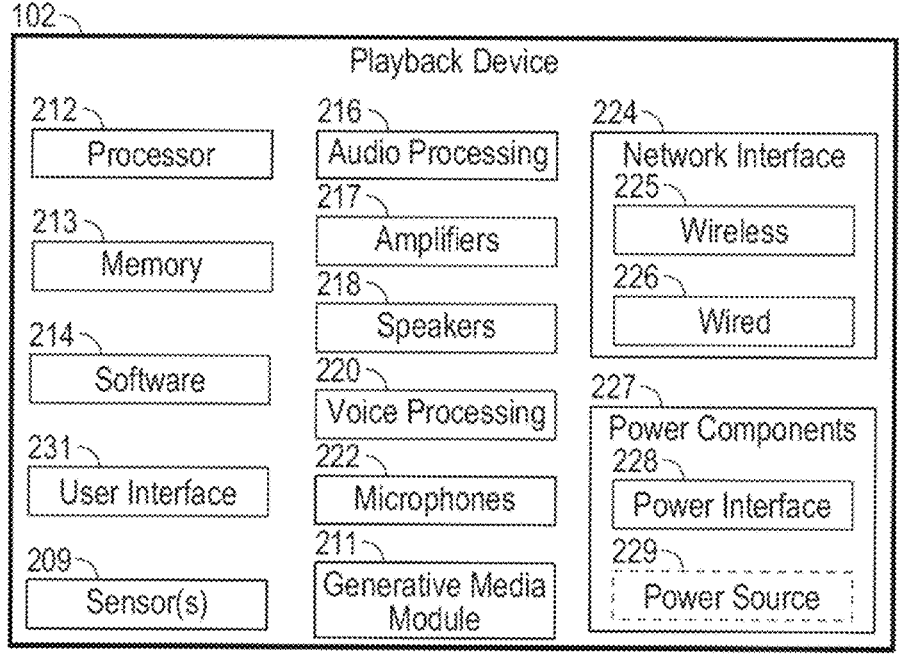
FIG. 2A is a functional block diagram of an example playback device.

FIG. 2A is a functional block diagram illustrating certain aspects of one of the playback devices 102 of the MPS 100 of FIGS. 1A-1C. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A includes both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. Patent Publication No. 2017/0242653.

As further shown in FIG. 2A, the playback device 102 also includes power components 227. The power components 227 may include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." Those portable playback devices that weigh no more than fifty ounces (e.g., between three ounces and fifty ounces, between five ounces and fifty ounces, between ten ounces and fifty ounces, between ten ounces and twenty-five ounces, etc.) may be referred to herein as an "ultra-portable playback device." Those playback devices that operate using an external power source instead of an internal power source may be referred to herein as a "stationary playback device," although such a device may in fact be moved around a home or other environment.

The playback device 102 may further include a user interface 231 that may facilitate user interactions independent of or in conjunction with user interactions facilitated by one or more of the controller devices 104. In various embodiments, the user interface 231 includes one or more physical buttons and/or supports graphical interfaces provided on touch sensitive screen(s) and/or surface(s), among other possibilities, for a user to directly provide input. The user interface 231 may further include one or more of lights (e.g., LEDs) and the speakers to provide visual and/or audio feedback to a user.

As shown in FIG. 2A, the playback device 102 can also include one or more sensor(s) 209. The sensors 209 include any suitable sensor, whatever values are measured thereby. Examples of suitable sensors include user engagement sensors to determine whether a user is wearing or touching a wearable playback device, microphone(s) or other audio capture devices, cameras or other imaging devices, accelerometers, gyroscopes, or other motion or activity sensors, physiological sensors to measure physiological parameters like heart rate, breathing rate, blood pressure, brainwaves, activity levels, movement, body temperature, etc. In some instances, the sensor(s) 209 can be wearable (e.g., with either the playback device 102 itself being wearable, or with the sensor(s) 209 being separate from the playback device 102 while remaining communicatively coupled to the playback device 102.

The playback device 102 can also optionally include a generative media module 211 that is configured to produce generative media content, either alone or in conjunction with other devices (e.g., other local playback and non-playback devices, remote computing devices 154 (FIG. 1C), etc.). As noted previously, generative media content can include any media content (e.g., audio, video, audio-visual output, tactile output, or any other media content) that is dynamically created, synthesized, and/or modified by a non-human, rule-based process such as an algorithm or model, even if human input is involved in the process. Although such processes can be rule-based, they need not be wholly deterministic, but may instead incorporate some aspect of randomness or other stochastic behavior. This creation or modification can occur for playback in real-time or near real-time. Additionally or alternatively, generative media content can be produced or modified asynchronously (e.g., ahead of time before playback is requested), and the particular item of generative media content may then be selected for playback at a later time. As used herein, a "generative media module" includes any system, whether implemented in software, a physical model, or combination thereof, that can produce generative media content based on one or more inputs. In some examples, such generative media content includes novel media content that can be created as wholly new or can be created by mixing, combining, manipulating, or otherwise modifying one or more pre-existing pieces of media content. As used herein, a "generative media content model" includes any algorithm, schema, or set of rules that can be used to produce novel generative media content using one or more inputs (e.g., sensor data, audio captured by on-board microphones, artist-provided parameters, media segments such as audio clips or samples, etc.). Among examples, a generative media module can use a variety of different generative media content models to produce different generative media content. In some instances, artists or other collaborators can interact with, author, and/or update generative media content models to produce particular generative media content. Although several examples throughout this discussion refer to audio content, the principles disclosed herein can be applied in some examples to other types of media content, e.g., video, audio-visual, tactile, or otherwise.

In some examples, a generative media module 211 can utilize one or more input parameters, such as data from the sensor(s) 209, from other sensors, in the form of playback device capabilities (e.g., number and type of transducers, output power, other system architecture), or device location (e.g., either location relative to other playback devices, relative to one or more users). Additional inputs can include a device state of one or more devices within the group, such as a thermal state (e.g., if a particular device is in danger of overheating, the generative content can be modified to reduce temperature), battery level (e.g., bass output can be reduced in a portable playback device with low battery levels), and bonding state (e.g., whether a particular playback device is configured as part of a stereo pair, bonded with a sub, or as part of a home theatre arrangement, etc.). Any other suitable device characteristic or state may similarly be used as an input for production of generative media content.

In the case of a wearable playback device, the position and/or orientation of the playback device relative to the environment can serve as an input for the generative media module 211. For instance, a spatial soundscape can be provided such that, when a user moves about an environment, the corresponding audio produced changes (e.g., waterfall sounds in one corner of a room, birdsong in another). Additionally or alternatively, as the user's orientation changes (facing one direction, tilting her head upward or downward, etc.), the corresponding audio output can be modified accordingly.

A user identity (either determined via the sensor(s) 209 or otherwise) can also serve as an input to the generative media module 211, such that the particular generative media produced by the generative media module 211 is tailored to the individual user. Another example input parameter includes user presence—for example when a new user enters a space playing back generative audio, the user's presence can be detected (e.g., via proximity sensors, a beacon, etc.) and the generative audio can be modified as a response. This modification can be based on number of users (e.g., with ambient, meditative audio for 1 user, relaxing music for 2-4 users, and party or dance music for greater than 4 users present). The modification can also be based on the identity of the user(s) present (e.g., a user profile based on the user's characteristics, listening history, or other such indicia).

Figure 2B:
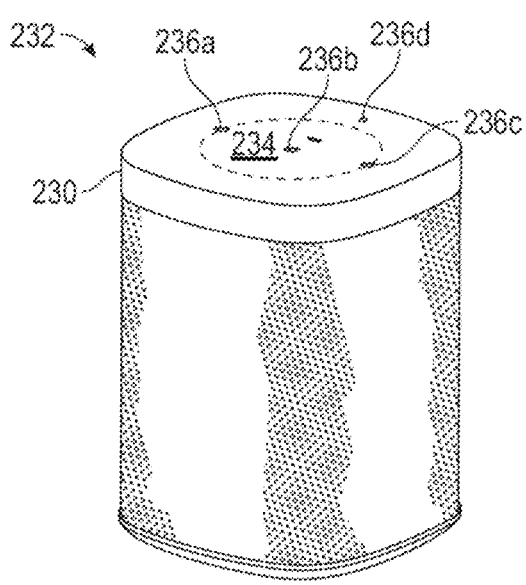
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

Figure 2C:
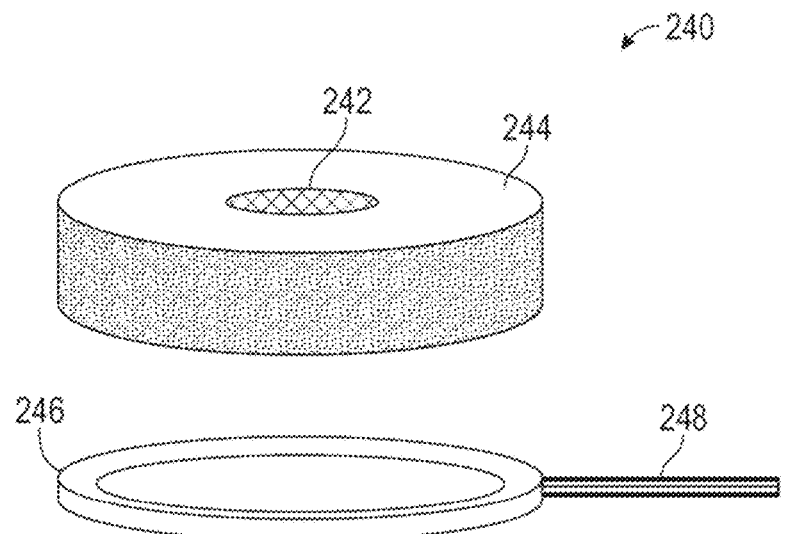
FIG. 2C is a diagram of another example housing for the playback device of FIG. 2A.

As mentioned above, the playback device 102 may be constructed as a portable playback device, such as an ultra-portable playback device, that comprises an internal power source. FIG. 2C shows an example housing 240 for such a portable playback device 102. As shown, the housing 240 of the portable playback device includes a user interface in the form of a control area 242 at a top portion 244 of the housing 240. The control area 242 may include a capacitive touch sensor for controlling audio playback, volume level, and other functions. The housing 240 of the portable playback device may be configured to engage with a dock 246 that is connected to an external power source via cable 248. The dock 246 may be configured to provide power to the portable playback device to recharge an internal battery. In some embodiments, the dock 246 may comprise a set of one or more conductive contacts (not shown) positioned on the top of the dock 246 that engage with conductive contacts on the bottom of the housing 240 (not shown). In other embodiments, the dock 246 may provide power from the cable 248 to the portable playback device without the use of conductive contacts. For example, the dock 246 may wirelessly charge the portable playback device via one or more inductive coils integrated into each of the dock 246 and the portable playback device.

Figure 2D:
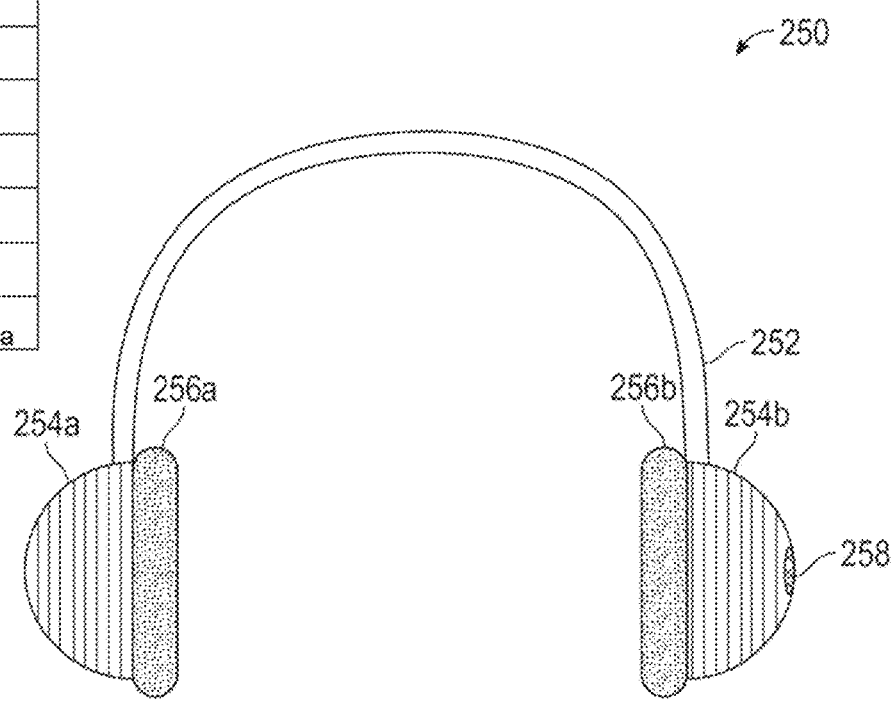
FIG. 2D is a diagram of another example housing for the playback device of FIG. 2A.

In some embodiments, the playback device 102 may take the form of a wired and/or wireless headphone (e.g., an over-ear headphone, an on-ear headphone, or an in-ear headphone). For instance, FIG. 2D shows an example housing 250 for such an implementation of the playback device 102. As shown, the housing 250 includes a headband 252 that couples a first earpiece 254a to a second earpiece 254b. Each of the earpieces 254a and 254b may house any portion of the electronic components in the playback device, such as one or more speakers. Further, one or more of the earpieces 254a and 254b may include a control area 258 for controlling audio playback, volume level, and other functions. The control area 258 may comprise any combination of the following: a capacitive touch sensor, a button, a switch, and a dial. As shown in FIG. 2D, the housing 250 may further include ear cushions 256a and 256b that are coupled to earpieces 254a and 254b, respectively. The ear cushions 256a and 256b may provide a soft barrier between the head of a user and the earpieces 254a and 254b, respectively, to improve user comfort and/or provide acoustic isolation from the ambient (e.g., passive noise reduction (PNR)). As noted above, the playback device 102 can include one or more sensors configured to detect various parameters, optionally including on-ear detection that indicates when a user is wearing and not wearing the headphone device. In some implementations, the wired and/or wireless headphones may be ultra-portable playback devices that are powered by an internal energy source and weigh less than fifty ounces.

Figure 2E:
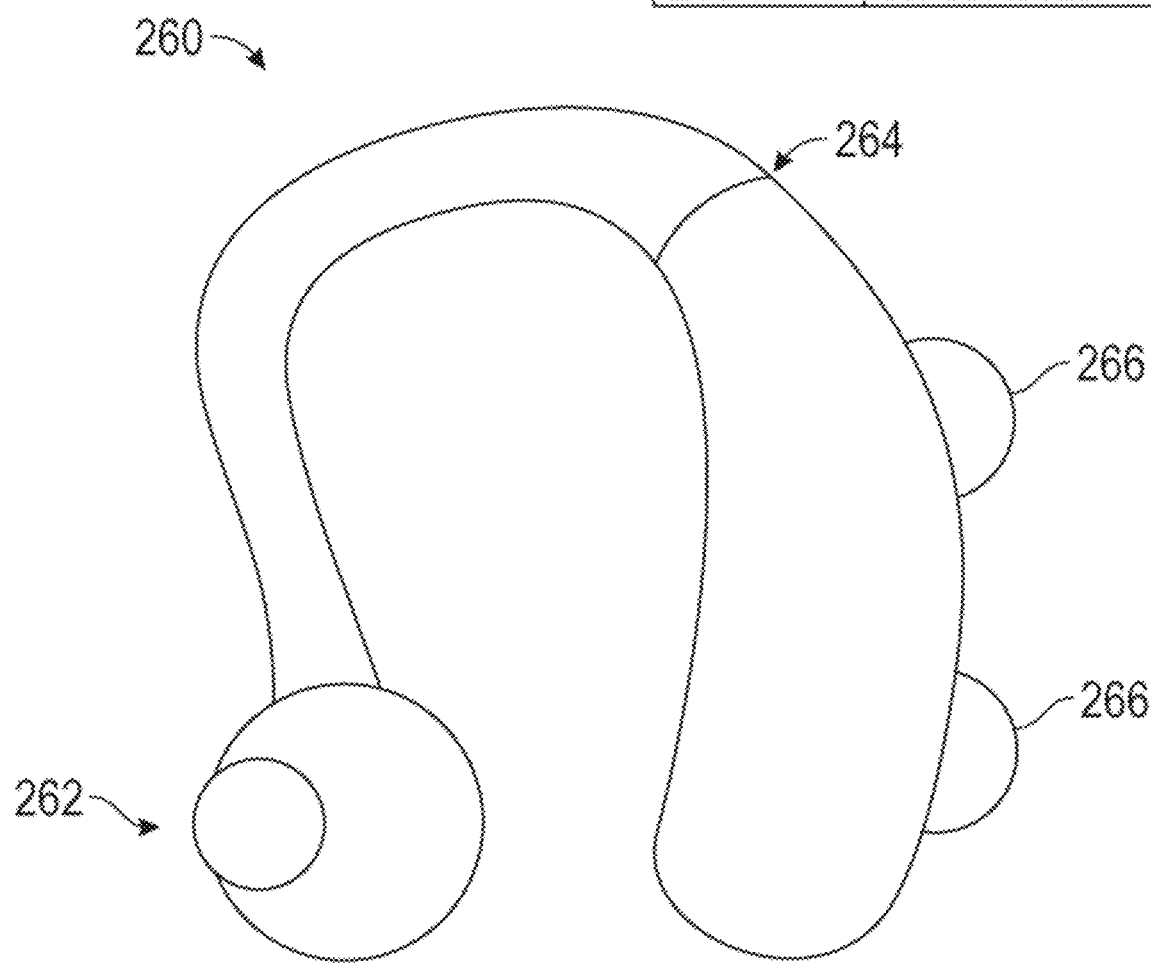
FIG. 2E is a diagram of another example housing for the playback device of FIG. 2A.

In some embodiments, the playback device 102 may take the form of an in-ear headphone or hearing-aid device. For instance, FIG. 2E shows an example housing 260 for such an implementation of the playback device 102. As shown, the housing 260 includes an in-ear portion 262 configured to be disposed in or adjacent a user's ear, and an over-ear portion 264 configured to extend over and behind a user's ear. The housing 260 may house any portion of the electronic components in the playback device, such as one or more audio transducers, microphones, and audio processing components. A plurality of control areas 266 can facilitate user input for controlling audio playback, volume level, noise cancellation, pairing with other devices, and other functions. The control area 258 may comprise any combination of the following: one or more buttons, switches, dials, capacitive touch sensors, etc. As noted above, the playback device 102 can include one or more sensors configured to detect various parameters, optionally including in-ear detection that indicates when a user is wearing and not wearing the in-ear headphone device.

It should be appreciated that the playback device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

While specific implementations of playback and network microphone devices have been described above with respect to FIGS. 2A-2E, there are numerous configurations of devices, including, but not limited to, those having no UI, microphones in different locations, multiple microphone arrays positioned in different arrangements, and/or any other configuration as appropriate to the requirements of a given application. For example, UIs and/or microphone arrays can be implemented in other playback devices and/or computing devices rather than those described herein. Further, although a specific example of playback device 102 is described with reference to MPS 100, one skilled in the art will recognize that playback devices as described herein can be used in a variety of different environments, including (but not limited to) environments with more and/or fewer elements, without departing from this invention. Likewise, MPSs as described herein can be used with various different playback devices.

By way of illustration, SONOS, Inc. presently offers (or has offered) for sale certain playback devices that may implement certain of the embodiments disclosed herein, including a "SONOS ONE," "FIVE," "PLAYBAR," "AMP," "CONNECT:AMP," "PLAYBASE," "BEAM," "ARC," "CONNECT," "MOVE," "ROAM," and "SUB." Any other past, present, and/or future playback devices may additionally or alternatively be used to implement the playback devices of example embodiments disclosed herein. Additionally, it should be understood that a playback device is not limited to the examples illustrated in FIGS. 2A-2D or to the SONOS product offerings. For example, a playback device may be integral to another device or component such as a television, a lighting fixture, or some other device for indoor or outdoor use.

b. Example Playback Device Configurations

Figure 3B:
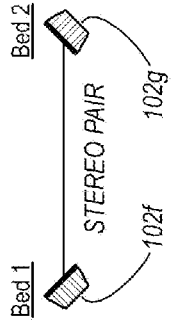
FIGS. 3A-3E are diagrams showing example playback device configurations in accordance with aspects of the disclosure.
Figure 3C:
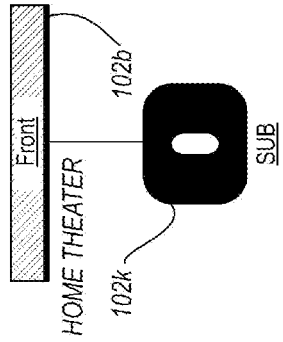
Figure 3D:
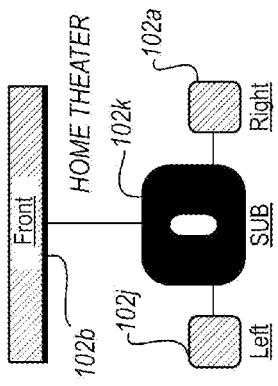
Figure 3E:
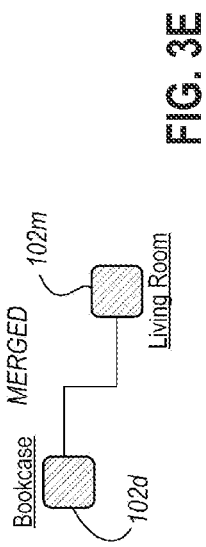
Figure 3A:
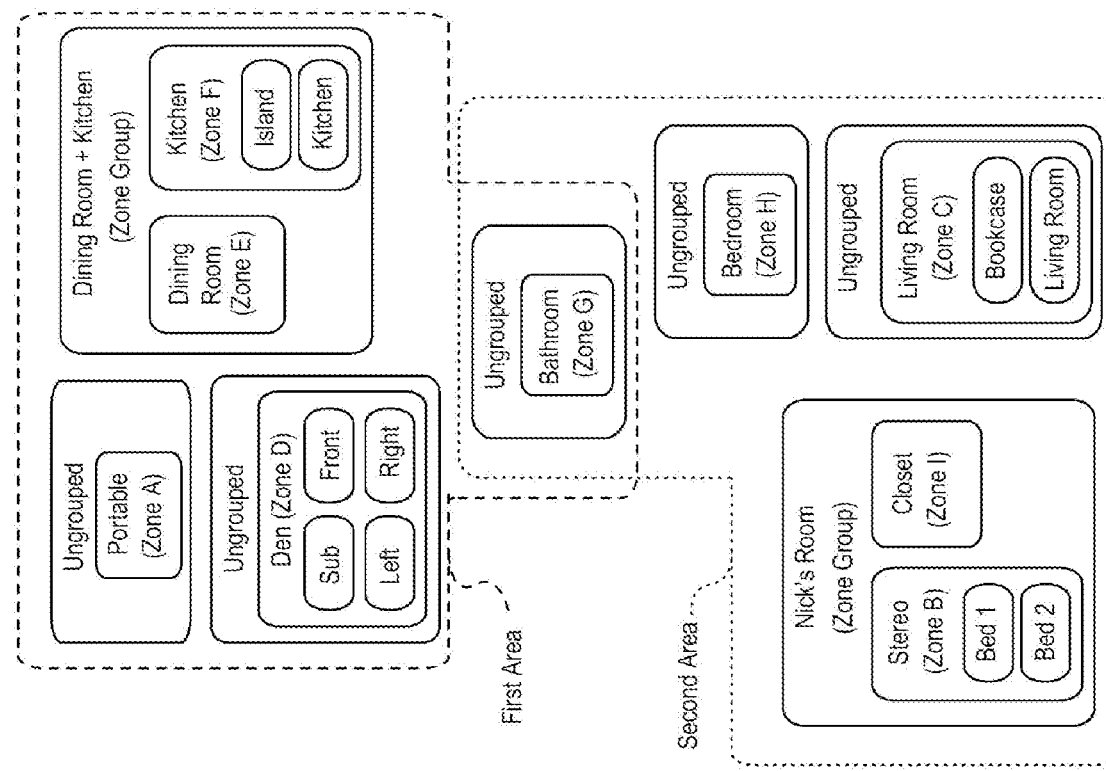

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

Figure 4A:
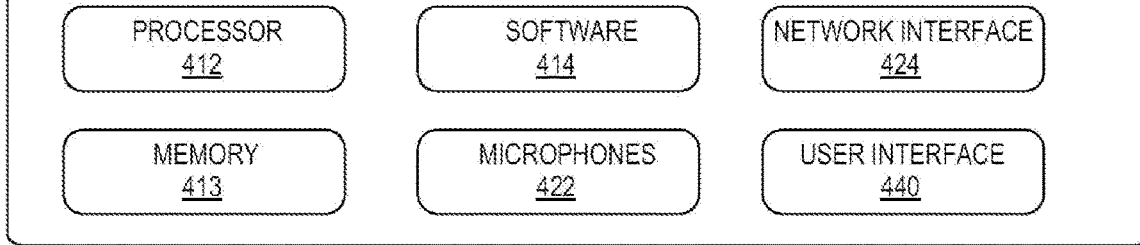
FIG. 4A is a functional block diagram of an example controller device in accordance with aspects of the disclosure.

FIG. 4A is a functional block diagram illustrating certain aspects of a selected one of the controller devices 104 of the MPS 100 of FIG. 1A. Controller devices in accordance with several embodiments of the invention can be used in various systems, such as (but not limited to) an MPS as described in FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 may be configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figures 4B, 4C:
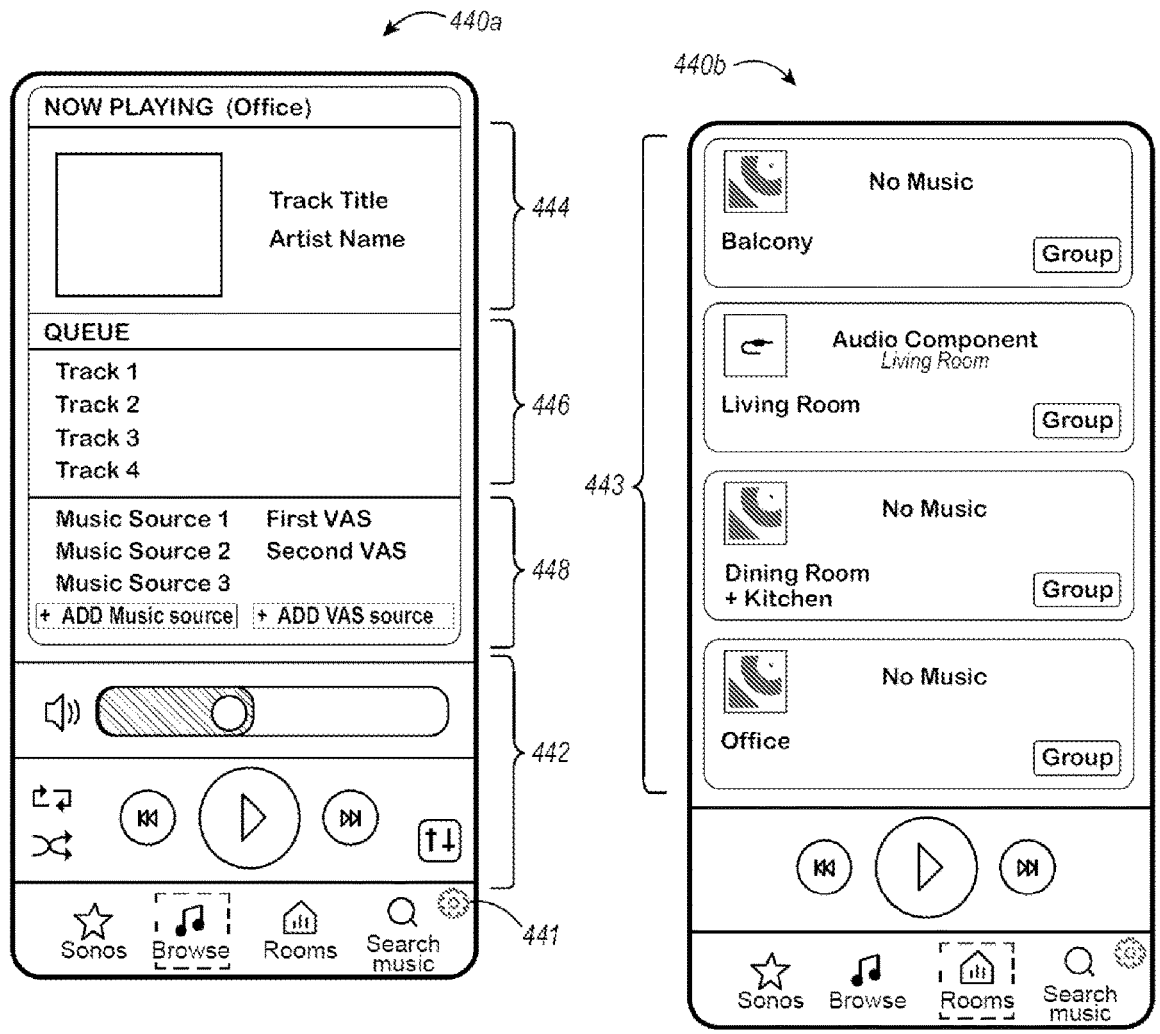
FIGS. 4B and 4C are controller interfaces in accordance with aspects of the disclosure.

As shown in FIG. 4A, the controller device 104 may also include a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b include a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIGS. 1A-1C, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

III. Example Generative Audio Playback Via Wearable Playback Devices

Figure 5D:
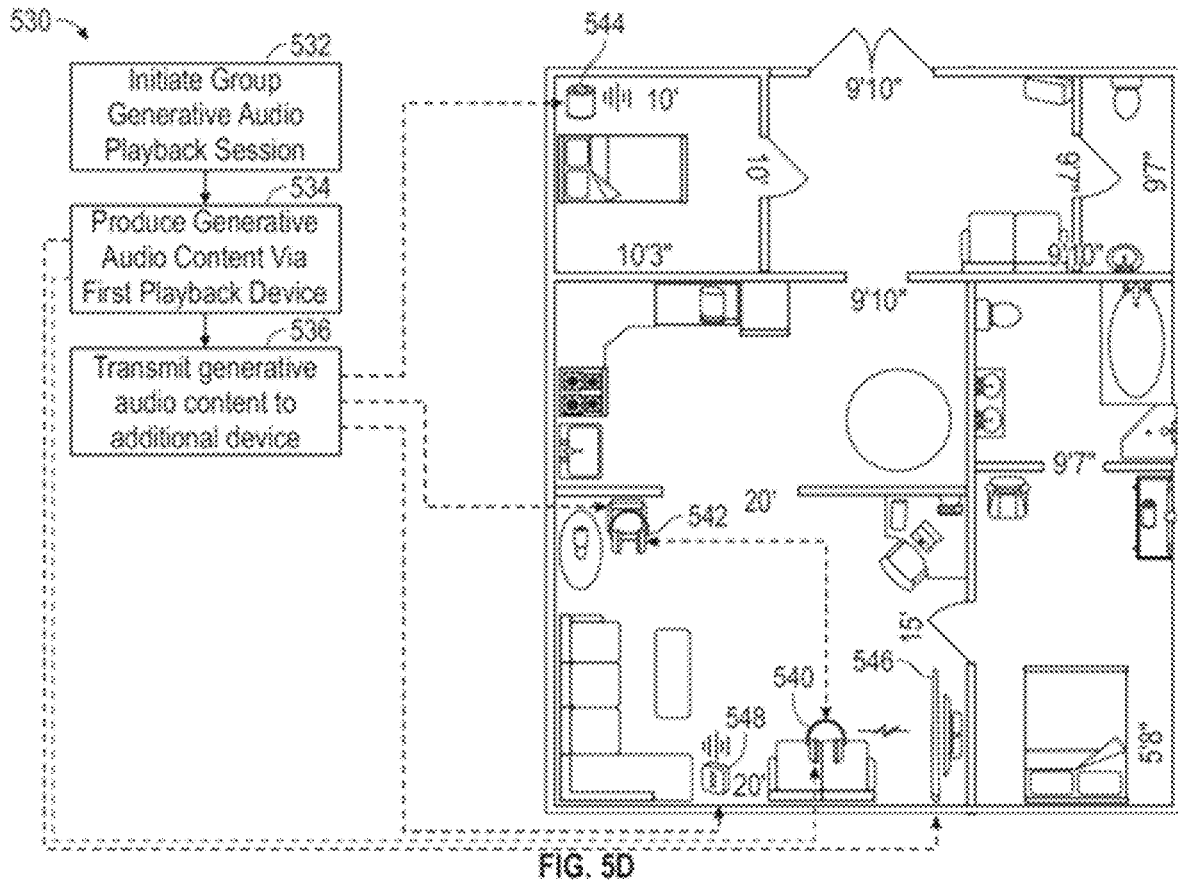

Generative audio content enables the creation and delivery of audio content tailored to a particular user, a particular environment, and/or to a particular time. In the case of wearable playback devices, generative audio content can be further tailored based on parameters detected via the wearable playback device, and playback can be controlled and distributed among various playback devices within the environment based on contextual data. For example, a wearable playback device can detect that it is being worn by a user and automatically initiate playback of generative audio content, which may include a generative music composition based at least in part on one or more media content stems and/or audio cues derived from contextual data. The contextual data may include information relating to the user's environment (e.g., time of day, temperature, circadian rhythm, humidity, number of persons in proximity, ambient light levels) or other types of indicators (e.g., doorbells, alarms, events). Such contextual data can be obtained via on-board sensor(s) carried by the wearable playback device, sensors associated with other playback devices within the environment, or any other suitable sensor data source. In certain examples, the wearable playback device can identify the particular user when the playback device is placed on the user's head, and the wearable playback device may further tailor the generative media content to the user's profile, current or desired emotional state, and/or other biometric data. Moreover, in some instances playback of generative audio content can dynamically swap or toggle between playing solely via a wearable playback device and playing alternatively or concurrently via one or more out-loud playback devices within the listening environment. In some examples, the wearable playback device provides one or more contextual inputs to a generative soundscape played back via one or more out-loud playback devices and, optionally, via the wearable playback device. Consider, for instance, scenarios in which one or more listeners wish to monitor biometric data (e.g., heart rate, respiratory rate, temperature, blood glucose level, blood oxygen saturation percentage) of the wearer of the wearable playback device because the wearer may suffer from an illness, be an elderly person, a child, or otherwise be differently abled from one or more of the out-loud listeners. One or more generative soundscapes can be generated and played back using one or more biometric parameters of the wearer to allow the out-loud listeners to monitor the parameters via the soundscape(s).

a. Producing and Playing Back Generative Audio Content Via Wearable Playback Devices FIGS. 5A-5D illustrate example methods for generative audio playback via a wearable audio playback device. With reference to FIG. 5A, the method 500 begins at block 502 with on-ear detection. For example, an on-board sensor can determine when the wearable playback device is placed into position over or against the user's head (e.g., with an earcup over the user's ear, or an earphone placed within the user's ear, etc.). The on-board sensor can take any suitable form, such as an optical proximity sensor, a capacitive or inductive touch sensor, a gyroscope, accelerometer, or other motion sensor, etc.

Once the on-ear detection has occurred, the method 500 proceeds to block 504, which involves automatically beginning playback of generative audio content via the wearable playback device. As noted previously, generative media content (such as generative audio content) can be produced via an on-board generative media module residing on the wearable playback device, via generative media module(s) residing on other local playback devices or computing devices (e.g., accessible via a local area network (e.g., WiFi) or direct wireless connection (e.g., Bluetooth)). Additionally or alternatively, the generative media content can be produced by one or more remote computing devices, optionally using one or more input parameters provided by the wearable playback device and/or the media playback system that includes the wearable playback device. In some instances, the generative media content can be produced by a combination of any of these devices.

At block 506, the on-ear position is no longer detected (e.g., via one or more on-board sensors), and in block 508 playback of the generative audio content ceases. Optionally, playback of the generative media content can be automatically transitioned or swapped to playback via one or more other playback devices within the environment, such as one or more out-loud playback devices. Such playback control including swapping is described in more detail below with respect to FIGS. 10A-10D.

In the process depicted in FIG. 5A, the wearable playback device is configured to automatically begin playback of generative audio content upon being donned by the user, and to automatically terminate playback of the generative audio content once removed by the user. Optionally, this process can be conducted without the wearable playback device being tethered or otherwise connected to another device.

In various examples, the generative audio content can be a soundscape that is tailored to the user and/or the user's environment. For example, the generative audio can be responsive to the user's current emotional state (e.g., as determined via one or more sensors of the wearable playback device) and/or contextual data (e.g., information regarding the user's environment or household, external data such as events outside the user's environment, time of day, etc.).

FIG. 5B illustrates another example method 510, which begins in block 512 with playing back generative audio via a wearable playback device. At block 514, a Bluetooth connection to an audio source (e.g., a mobile phone, tablet, etc.) or a WiFi audio source is detected. Following this detection, the method 510 continues in block 516 with transitioning from generative audio playback to source audio playback. Optionally, this transition may only take place once source audio playback begins, thereby ensuring that the user will not be left with unwanted silence.

In some examples, the transition can include crossfading for a predetermined amount of time (e.g., 5 s, 10 s, 20 s, 30 s) so that the transition between the generative audio content and the source audio is gradual. Transitions can also be based on other factors such as transients or "drops" in content, or staggered by frequency band and detected energy within that band. In some instances, the source audio type (e.g., music, spoken word, telephony) may also be detected, and the crossfade time may be adjusted accordingly. For example, the crossfade may be a longer time (e.g., 10 s) for music, an intermediate time for spoken word (e.g., 5 s) and a shorter time for telephony (e.g., 0 s, 1 s, 2 s). Optionally, the transition may involve initiating active noise control (ANC) if such functionality was not already in use during playback, or terminating active noise control (ANC) if it was previously in use.

FIG. 5C illustrates an example method 520. At block 522, the Bluetooth, WiFi, or other wirelessly connected audio source is no longer detected at the wearable playback device. In block 524, the wearable playback device automatically transitions to playing back generative audio content. This transition can likewise include crossfading and/or toggling ANC functionality as described above.

Optionally, as depicted in block 526, the audio from the Bluetooth or WiFi source that was previously played back (e.g., block 516 of FIG. 5B) can be used as an input parameter (e.g., a stem or seed) for the generative media module, such that when playback of the generative audio content resumes in block 524, the generative audio content includes certain characteristics or is otherwise based at least in part upon the prior source audio. This can facilitate a sense of continuity between the different media content being played back.

FIG. 5D illustrates an example method 530 and accompanying scenario for playing back generative audio content via a plurality of playback devices. The method 530 begins in block 532 with initiating a group generative audio playback session. For example, a wearable playback device can be grouped for synchronous playback with one or more additional playback devices, which may include one or more out-loud playback devices. In this configuration, the various playback devices can play back the generative media content in synchrony. In the example illustrated in FIG. 5D, the wearable device 540 is grouped with a second wearable playback device 542 and out-loud playback devices 544, 546, and 548.

In block 534, a first playback device produces generative audio content. In various examples, the first playback device can be a wearable playback device (e.g. playback device 540), an out-loud playback device (e.g., playback device 546), or a combination of playback devices working in concert to produce the generative audio content. As noted elsewhere, the generative audio content can be based at least in part on sensor and/or contextual data, which may be derived at least in part from the playback devices themselves.

The method 530 continues in block 536 with transmitting the generative audio content to additional playback devices within the environment. The various playback devices may then play back the generative audio content in synchrony with one another.

In some examples, the wearable playback device 542 can be selected as the group coordinator for the synchrony group, particularly if the wearable playback device 542 is already playing back the generative audio content. In other examples, however, the playback device 548 may be selected as the group coordinator, for instance because it has the highest computational capacity, it is plugged into a power source, has better network hardware or network connection, etc.

In some examples, the out-loud playback device 548 (e.g., a subwoofer) is bonded to the out-loud playback device 546 (e.g., a soundbar), and low-frequency audio content can be played back via the out-loud playback device 548 without any audio being played back via the out-loud playback device 546. For instance, the listener of the wearable playback device 540 and/or wearable playback device 542 may wish to utilize the low-frequency capabilities provided by a subwoofer such as out-loud playback device 548 while listening to the generative audio content via the wearable playback devices 540, 542. In some implementations, a sub may play back low frequency content meant to be heard with multiple but different items of high frequency content (e.g., a single sub and sub content channel can provide bass content for both a headphone and an out-loud listener, even though the high-frequency content for each may be different.

Figure 6:
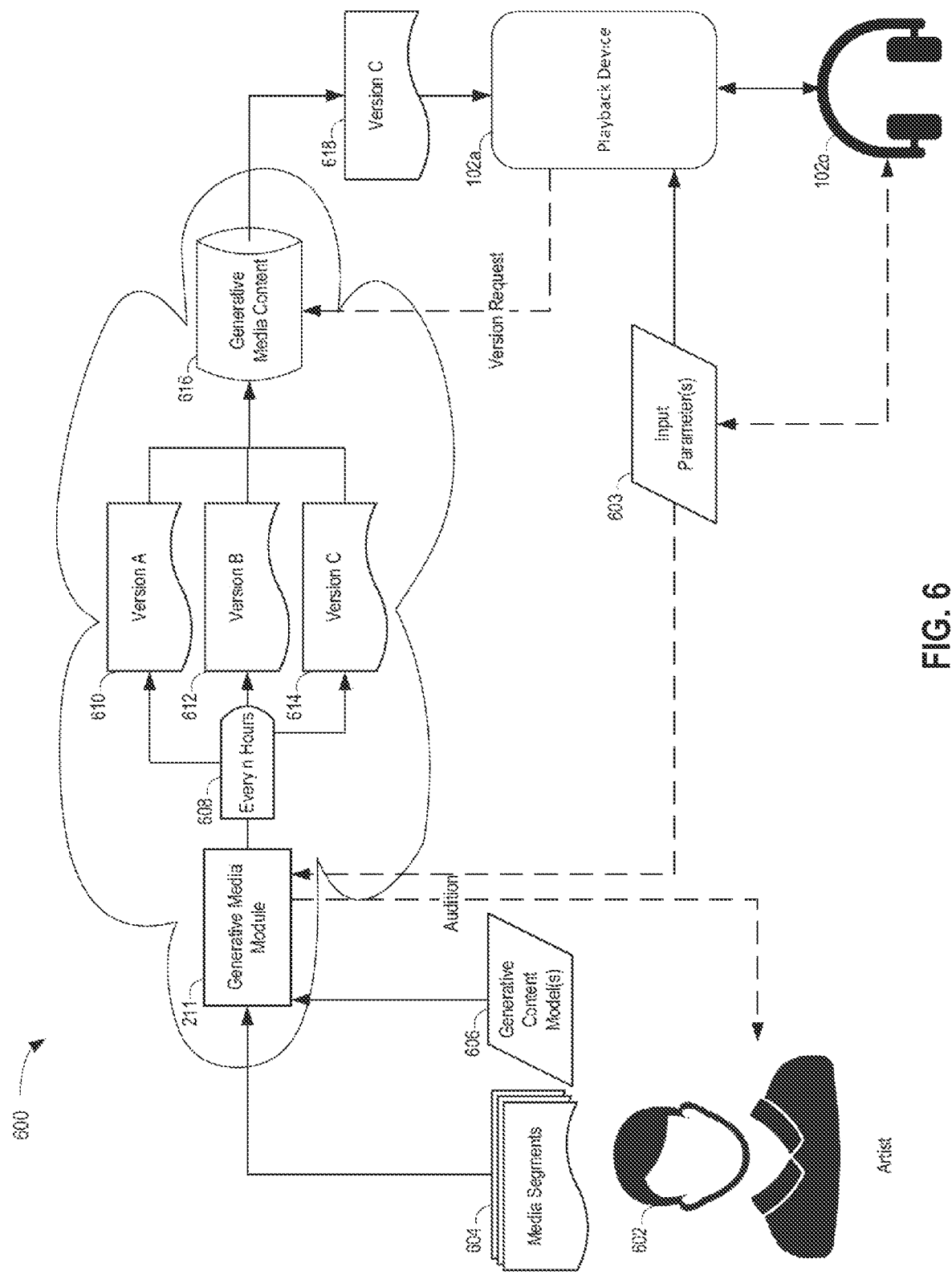
FIG. 6 is a schematic diagram of a system for producing and playing back generative media content in accordance with aspects of the disclosure.

FIG. 6 is a schematic diagram of an example distributed generative media playback system 600. As illustrated, an artist 602 can supply a plurality of media segments 604 and one or more generative content models 606 to a generative media module 211 stored via one or more remote computing devices. The media segments can correspond to, for example, particular audio segments or seeds (e.g., individual notes or chords, short tracks of n bars, non-musical content, etc.). In some examples, the generative content models 606 can also be supplied by the artist 602. This can include providing the entire model, or the artist 602 may provide inputs to the model 606, for example by varying or tuning certain aspects (e.g., tempo, melody constraints, harmony complexity parameter, chord change density parameter, etc.). Additionally, this process can involve seamless looping that can use a segment of a longer stem and recombine it endlessly.

The generative media module 211 can receive both the media segments 604 and one or more input parameters 603 (as described elsewhere herein). Based on these inputs, the generative media module 211 can output generative media. As shown in FIG. 6, the artist 602 can optionally audition the generative media module 211, for example by receiving exemplary outputs based on the inputs provided by the artist 602 (e.g., the media segments 604 and/or generative content model(s) 606). In some cases, the audition can play back to the artist 602 variations of the generative media content depending on a variety of different input parameters (e.g., with one version corresponding to a high energy level intended to produce an exciting or uplifting effect, another version corresponding to a low energy level intended to produce a calming effect, etc.). Based on the outputs via this audition step, the artist 602 may dynamically update the media segments 604 and/or settings of the generative content model(s) 606 until the desired outputs are achieved.

In the illustrated example, there can be an iteration at block 608 every n hours (or minutes, days, etc.) at which the generative media module 211 can produce a plurality of different versions of the generative media content. In the illustrated example, there are three versions: version A in block 610, version B in block 612, and version C in block 614. These outputs are then stored (e.g., via the remote computing device(s)) as generative media content 616. A particular one of the versions (version C as block 618 in this example) can be transmitted (e.g., streamed) to the local playback device 102a for playback.

Although three versions are shown here by way of example, in practice there may be many more versions of generative media content produced via the remote computing devices. The versions can vary along a number of different dimensions, such as being suitable for different energy levels, suitable for different intended tasks or activities (e.g., studying versus dancing), suitable for different time of day, or any other appropriate variations.

In the illustrated example, the playback device 102a can periodically request a particular version of the generative media content from the remote computing device(s). Such requests can be based on, for example, user inputs (e.g., user selection via a controller device), sensor data (e.g., number of people present in a room, background noise levels, etc.), or other suitable input parameter. As illustrated, the input parameter(s) 603 can optionally be provided to (or detected by) the playback device 102a. Additionally or alternatively, the input parameter(s) 603 can be provided to (or detected by) the remote computing device(s) 106. In some examples, the playback device 102a transmits the input parameters to the remote computing device(s) 106, which in turn provide a suitable version to the playback device 102a, without the playback device 102a specifically requesting a particular version.

The out-loud playback device 102a can transmit the generative media content 616 to the wearable playback device 102o, via WiFi, Bluetooth, or other suitable wireless connection. Optionally, the wearable playback device 102o can also provide one or more input parameters (e.g., sensor data from the wearable playback device 102o) which may be used as inputs for the generative media module 211. Additionally or alternatively, the wearable playback device 102o can receive one or more input parameters 603, which may be used to modify playback of the generative audio content via the wearable playback device 102o.

Figure 7:
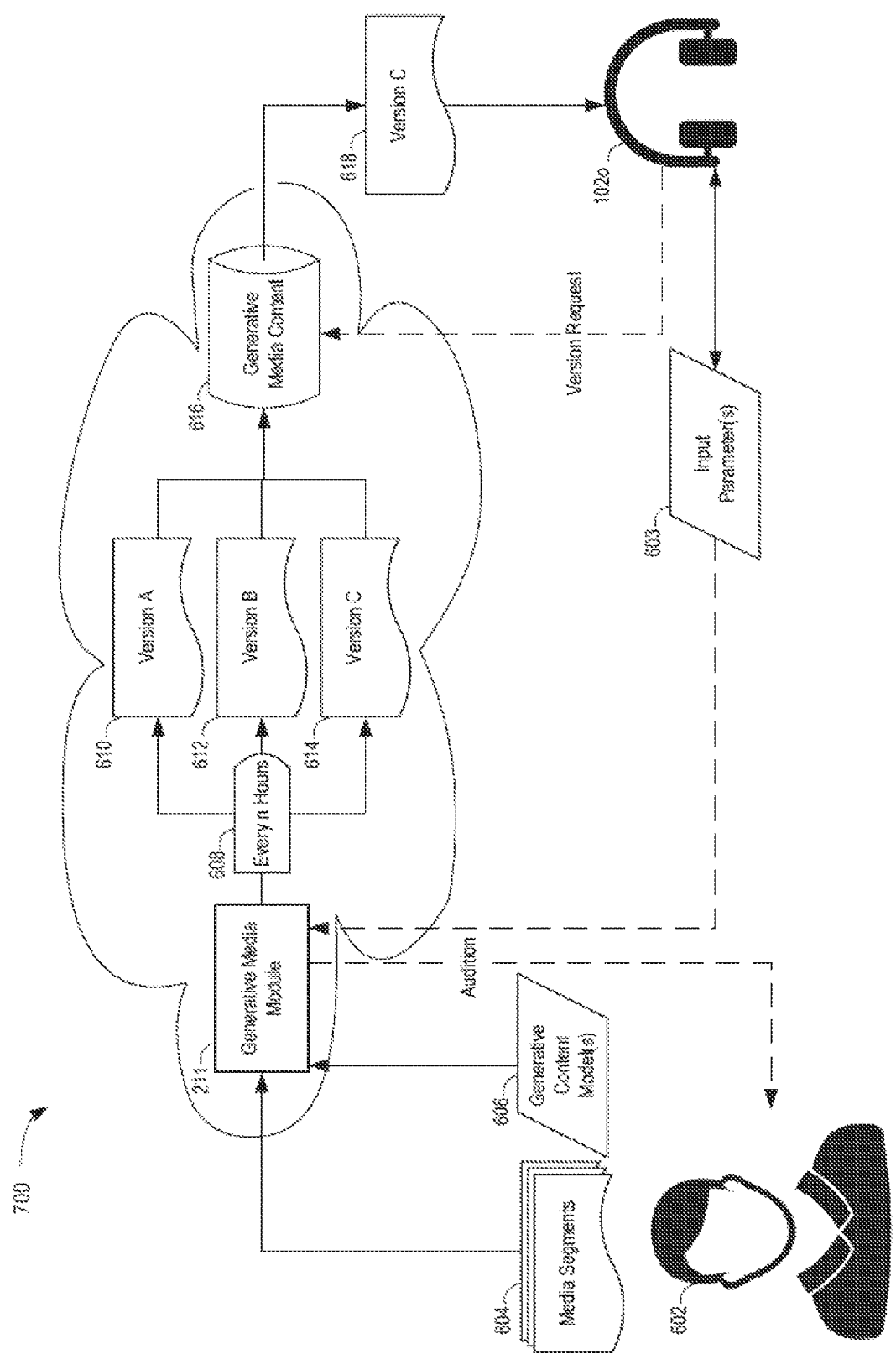
FIG. 7 is a schematic diagram of another system for producing and playing back generative media content in accordance with aspects of the disclosure.

FIG. 7 is a schematic diagram of an example system 700 for producing and playing back generative media content. The system 700 can be similar to the system 600 described above with respect to FIG. 6, except that the generative media content 616 (e.g., version C 618) can be transmitted directly from the remote computing device(s) to the wearable playback device 102o. As noted previously, the generative media content may then be further distributed from the wearable playback device 102o to additional playback devices within the environment, including other wearable playback devices and/or out-loud playback devices.

b. Location Determination and Customization for Generative Media Playback

In various examples, the production, distribution, and playback of generative media content can be controlled and/or modulated based on location information, user identity, or other such parameters. FIGS. 8A-8D illustrate example methods for playing back generative audio based on location. With respect to FIG. 8A, the method 800 begins in block 802 with on-ear detection. Optionally, following on-ear detection, the method 800 proceeds to block 804, which involves identifying the user. User identification can be performed using any suitable technique, such as voice recognition, a fingerprint touch sensor, entry of a user-specific code via a user input, facial recognition via an imaging device, or any other suitable technique. In some instances, the user identity can be inferred based on connected Bluetooth device(s) (e.g., if the wearable playback device is connected to John Smith's mobile phone, then John Smith is identified as the user following on-ear detection). Optionally, the user identity can be a pseudo-identity, in which the preferences for distinct profiles are stored but are not matched to a single user account or real-world identity.

At block 806, the wearable playback device plays back particular generative audio content based on user location and optionally user identity. Location can be determined using any suitable localization techniques, such as exchange of localization signals with other devices within the environment (e.g., UWB localization, WiFi RSSI evaluation, acoustic localization signals, etc.). In some examples, the wearable playback device can include a GPS component configured to provide absolute location data. As illustrated, the process 800 can branch to the methods 820, 830, and/or 840 described below with respect to FIGS. 8B, 8C, and 8D. Additional examples regarding location determination can be found in the accompanying Appendix.

In some examples, the generative audio content that is produced and played back at block 806 is based on particular real-time contextual information (e.g., temperature, light, humidity, time of day, user's emotional state) in addition to location information. If the user's identity has been determined, then the generative audio content can be produced according to one or more user preferences or other input parameters particular to that user (e.g., user's listening history, favorite artists, etc.). In some instances, the wearable playback device may only initiate playback of the generative audio content if the identified user is authorized to use or is otherwise associated with the wearable device.

At decision block 808, if the location has not changed, the method reverts to block 806 and continues playing back the generative audio content based on the location and optionally user identity. If, at decision block 808, the location has changed (e.g., as determined via sensor data), the method 800 continues to block 810 with identifying the new location, and in block 812 playing back particular generative audio content based on the new location. For instance, moving from the kitchen to a home office within a home environment can cause the generative audio content to automatically transition to more peaceful, focus-enhancing audio content, whereas moving to a home gym may cause the generative audio content to transition to more upbeat, high-energy audio content. The way the transition happens may have a significant impact on user experience. For most cases, slow/smooth transitions will be preferred, but transitions may also be more complex (e.g., increasing a sense of spaciousness such that the sound feels contained by a given room, or even partially blend with a nearby user's audio when nearby).

In certain examples, the generative audio content can be produced based at least in part on a theme, mood, and/or comfortscape associated with a particular location. For instance, a room may have a theme (e.g., a forest room, a beach room, a tropical jungle room, a workout room) and the generative audio content that is generated and played back is based on a soundscape associated with that room. The generative audio content played back via the wearable playback device may be identical, substantially similar, or otherwise related to audio content that is typically played back by one or more out-loud devices in the room. In some examples, contextual-based audio cues may be layered onto the generative audio content associated with the room.

Figures 8A, 8B, 8C:
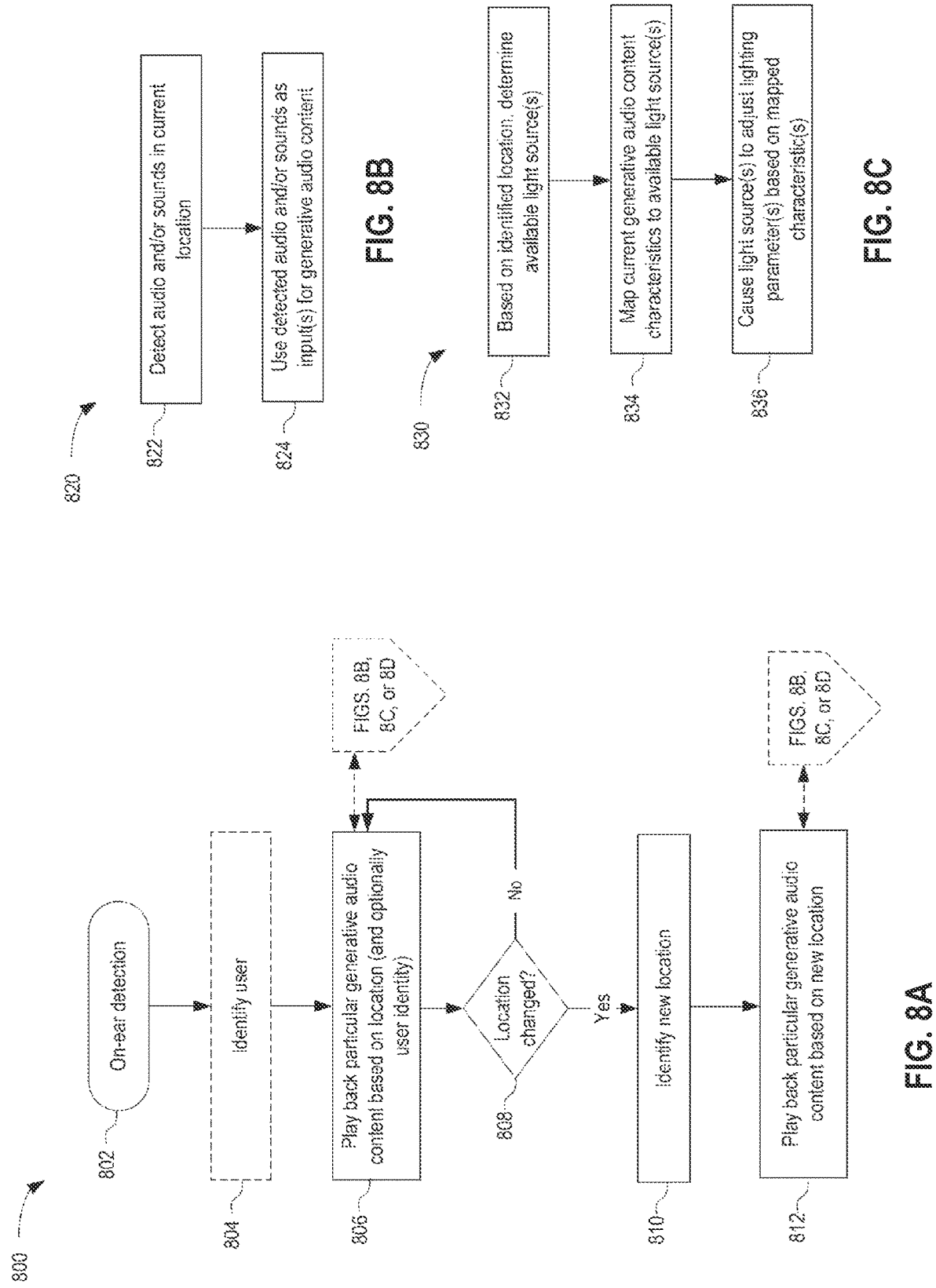
FIGS. 8A-8D illustrate example methods for playing back generative audio based on location in accordance with aspects of the disclosure.

FIG. 8B illustrates an example method 820, in which audio and/or sounds within a current location are detected at block 822. For instance, a wearable playback device can include one or more microphones (and/or other microphones within the environment can capture and transmit sound data to the wearable playback device). At block 824, the detected audio and/or sounds can be used as inputs for the generative audio content. Out-loud audio being played back via nearby playback devices, ambient noises and sounds within the user's environment, and/or audio being played back nearby another user via another wearable playback device, can be used as inputs for a generative media module to produce generative audio content that is responsive to, coheres with, and/or is otherwise at least partially influenced by the detected audio within the environment.

FIG. 8C illustrates an example method 830 for controlling light sources in a manner that corresponds to the generative audio content. The method 830 begins at block 832, which involves determining available light source(s) based on the identified location. These may be, for example, internet-connected light bulbs that are remotely controllable, televisions, and/or other displays). The light sources can be distributed within particular rooms or other locations within the environment. In block 834, the current generative audio content characteristics are mapped to available light source(s). And in block 836, the light source(s) adjust their respective lighting parameter(s) based on the mapped characteristic(s).

Characteristics of the generative audio content that can be mapped to the available light sources may include, for instance, mood, tempo, individual notes, chords, etc. Based on the mapped generative audio content characteristics, the individual light sources can have corresponding parameters (e.g., color, brightness/intensity, color temperature) adjusted accordingly.

Figure 8D:
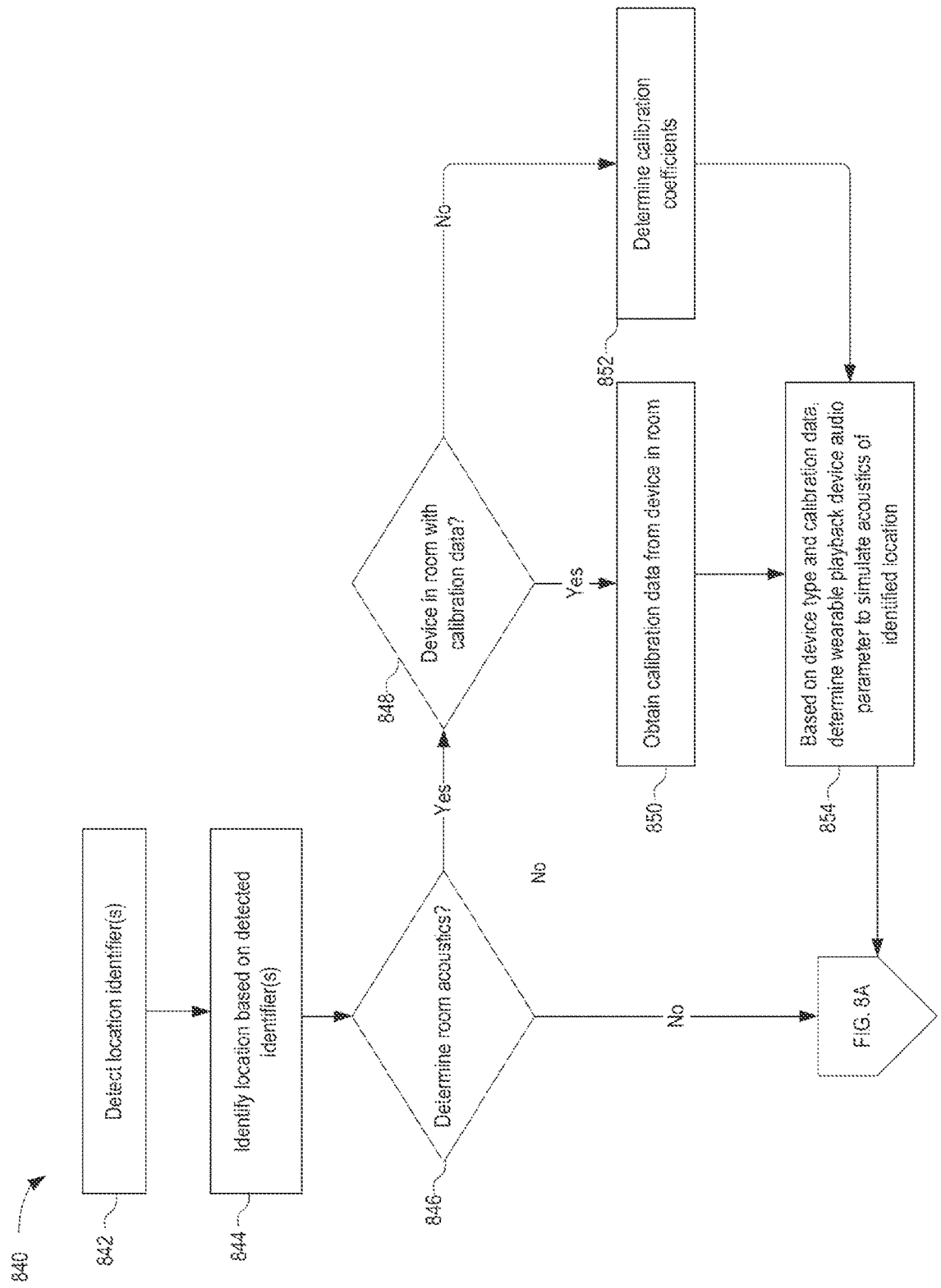

FIG. 8D illustrates an example method 840 for detecting location(s) and determining room acoustics of a particular listening environment (e.g., an environment in which a listener of a wearable playback device is located). The method 840 begins in block 842 with detecting location identifier(s), and in block 844 the method 840 involves identifying the location based on the detected identifier(s). This can include determining a location in which the user is currently positioned, using suitable sensor modality or combination of modalities (e.g., UWB localization, acoustic localization, BLE localization, ultrasonic localization, motion sensor data (e.g., IMU), wireless RSSI localization, etc.). In some examples, the user position can be mapped to predefined rooms or spaces, which may be stored via the media playback system for purposes of managing synchronous audio playback across the user's environment.

In decision block 846, if room acoustics are not to be determined, then the process can proceed to the method 800 shown in FIG. 8A. If the room acoustics are to be determined, then the method 840 proceeds to decision block 848. If the device is in a room with calibration data (e.g., a calibration procedure has previously been performed in the room and the calibration data is available to the media playback system), then the method proceeds to block 850 to obtain the spatial calibration data from the adjacent device in the room (or from another component of the media playback system). If, in block 848, the device is not in a room with pre-existing calibration data, then in block 852, the wearable playback device can determine calibration coefficients directly, for example by performing a calibration process. Examples of suitable calibration processes can be found in commonly owned U.S. Pat. No. 9,796,323, titled "Playback Device Calibration," and U.S. Pat. No. 9,763,018, titled "Calibration of Audio Playback Devices," each of which is hereby incorporated by reference in its entirety. In various examples, the wearable playback device can access calibration data obtained by another playback device within the particular room or location, or the wearable playback device may itself perform a calibration procedure to determine the calibration coefficients.

If the wearable device itself performs or is otherwise involved in determining the room acoustics, an out-loud playback device can be configured to emit calibration audio (e.g., a tone, a sweep, a chirp, or other suitable audio output) that can be detected and recorded via one or more microphones of the wearable playback device. The calibration audio data can then be used to perform a calibration (e.g., via the wearable playback device, the out-loud playback device, a control device, a remote computing device, or other suitable device or combination of devices) to determine a room acoustic profile that can be applied to the wearable playback device output. Optionally, the calibration determinations can also be used to calibrate audio output of other devices in the room such as, for instance, the out-loud playback device employed to emit the calibration audio.

At block 854, based on the device type and calibration data, the method can determine a wearable playback device audio parameter to simulate the acoustics of the identified location. For instance, using the calibration data from blocks 850 or 852, playback via the wearable playback device can be modified in a manner to simulate the acoustics of out-loud playback at that location. Once the audio parameter(s) are determined, the method 840 can proceed to the method 800 shown in FIG. 8A.

Figure 9:
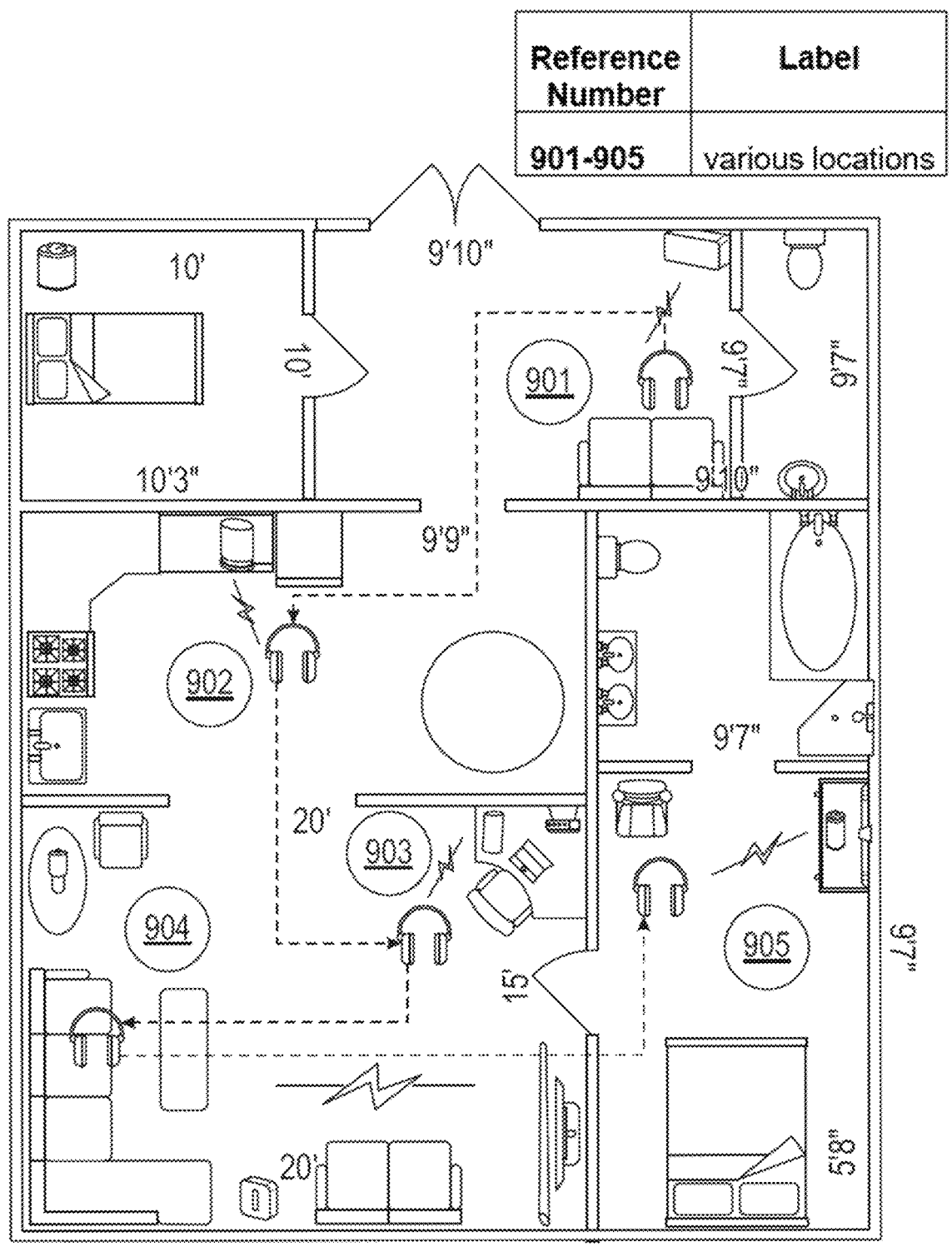
FIG. 9 illustrates an example scenario involving playing back generative audio via a wearable playback device within a household environment in accordance with aspects of the disclosure.

FIG. 9 illustrates an example scenario involving playing back generative audio content via a wearable playback device within a household environment. As illustrated, a user donning the wearable playback device can move to various locations 901-905 within the household environment. Optionally, the wearable playback device can be wirelessly connected (e.g., via Bluetooth, WiFi, or otherwise) to nearby playback devices for relaying data (e.g., audio content, playback control, timing and/or sensor data, etc.). In the illustrated scenario, at position 901 the user may be in the den working out and listening to an exercise soundscape with upbeat tempo. As the user moves to position 902 in the kitchen, the wearable playback device can automatically transition to playing back more relaxing generative audio content suitable for cooking, eating, or socializing. As the user moves to position 903 in the home office, the wearable playback device may automatically transition to playing back generative audio content suitable for work and focus. Next, at position 904 in the TV viewing area, the wearable playback device can transition to receiving audio data from a home theatre primary playback device so as to play back audio accompanying the video content being played back via the TV. Finally, when the user enters the bedroom at position 905, the wearable playback device can automatically transition from playing back TV audio to outputting relaxing generative audio content to facilitate the user's relaxation to prepare for sleep. In these and other examples, the wearable playback device can automatically transition playback, either by switching from generative audio content to other content sources, or by modulating the generative audio content itself, based on user location and/or other contextual data.

c. Playback Control Between Wearable and Out-loud Playback Devices

Figure 10A:
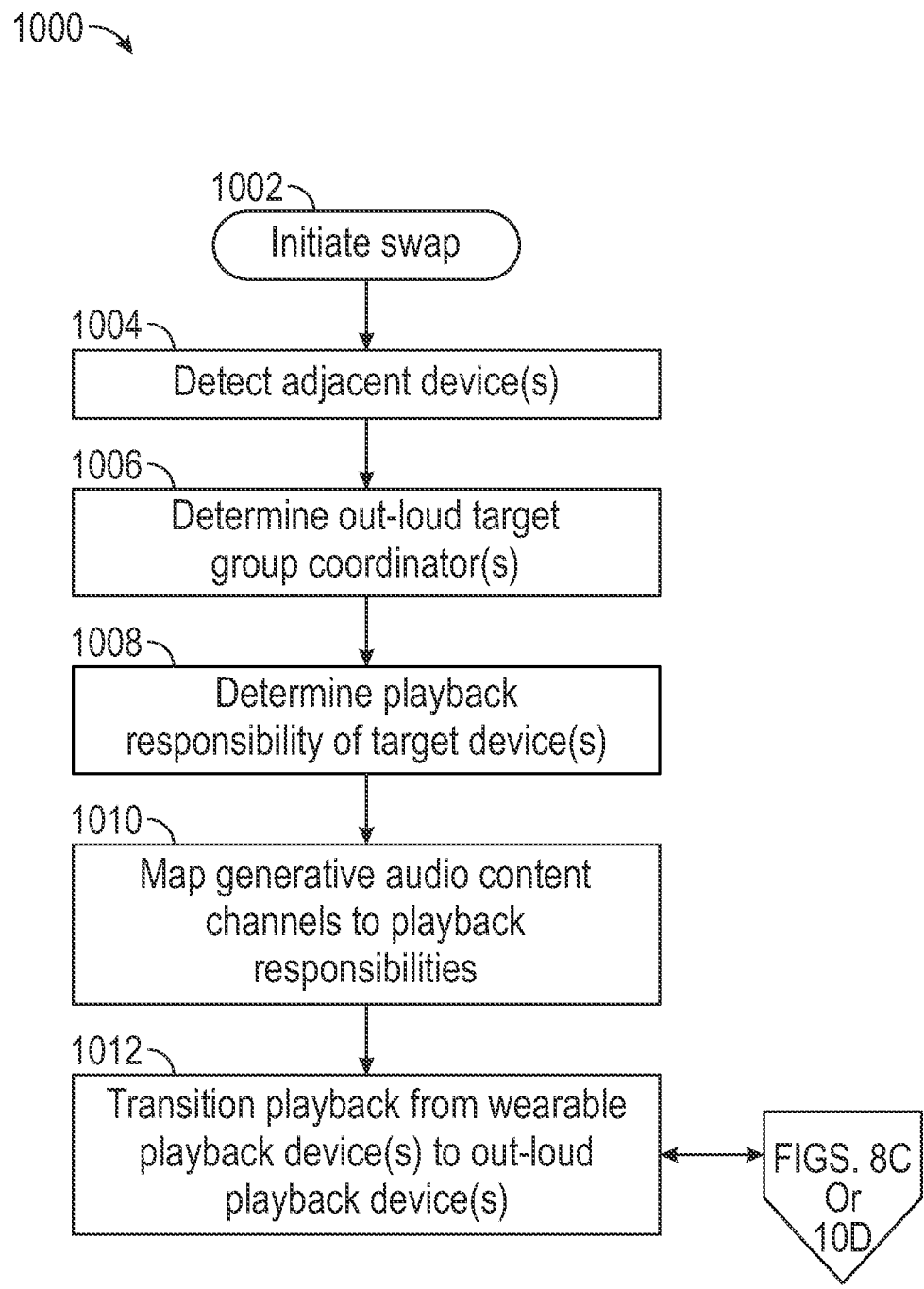
FIG. 10A illustrates an example method for swapping playback of generative audio between wearable playback device(s) and out-loud playback device(s) in accordance with aspects of the disclosure.
Figure 10B:
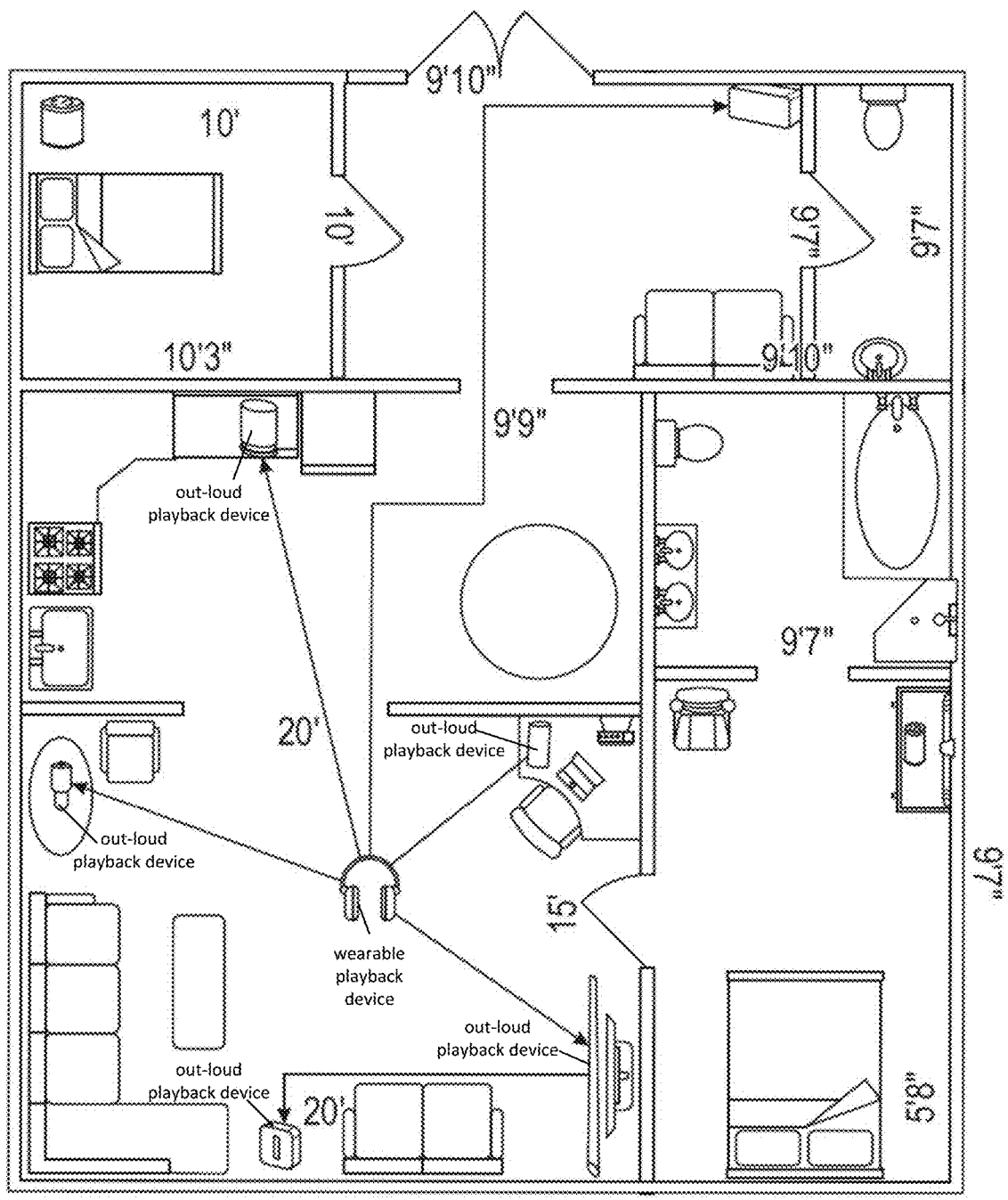
FIG. 10B illustrates an example scenario involving swapping playback of generative audio between wearable playback device(s) and out-loud playback device(s) in accordance with aspects of the disclosure.

FIG. 10A illustrates an example method 1000 for swapping playback of generative audio content between wearable playback device(s) and out-loud playback device(s), and FIG. 10B illustrates an example scenario involving swapping playback of generative audio content between wearable playback device(s) and out-loud playback device(s). The method 1000 begins at block 1002 with initiating a swap. A swap can involve moving playback of generative audio output from one device (e.g., a wearable playback device) to one or more nearby target devices (e.g., an out-loud playback device in substantial earshot of the wearable device).

In block 1006, in examples in which the generative audio is swapped to two or more target devices, an out-loud target group coordinator device can be selected among the target devices. The group coordinator can be selected based on parameters such as network connectivity, processing power, available memory, remaining battery power, location, etc. In some examples, the out-loud group coordinator is selected based on a prediction direction of the user's path within the environment. For instance, in the example of FIG. 10B, if the user is moving from the master bedroom (lower right hand corner) through the living room toward the kitchen, then a playback device in the Kitchen may be selected as the group coordinator.

At block 1008, the group coordinator may then determine playback responsibilities of the target device(s), which may depend on device positions, audio output capabilities (e.g., a subwoofer vs. an ultraportable), and other suitable parameters.

Block 1010 involves mapping the generative audio content channels to the playback responsibilities determined at block 1008, and in block 1012, playback transitions from the wearable playback device to the target out-loud playback device(s). In some instances, this swap can involve gradually decreasing a playback volume via the wearable playback device and gradually increasing a playback volume via the out-loud playback devices. Alternatively, the swap can involve an abrupt termination of playback via the wearable playback device and concurrent initiation of playback via the out-loud playback device(s).

There may be certain rules involved with group coordinator selection such, for instance, no portable devices and/or no subwoofer devices. In some examples, however, it may make sense to utilize a subwoofer or similar device as a group coordinator since it is likely to remain in the soundscape as the user moves throughout the home since its low frequency output will be utilized regardless of user location.

In some examples, the group coordinator is not a target device, but is instead another local device (e.g., a local hub device) or a remote computing device such a cloud server. In certain examples, the wearable device continues to produce the generative audio content and coordinates the audio among the swapped target devices.

Figure 10C:
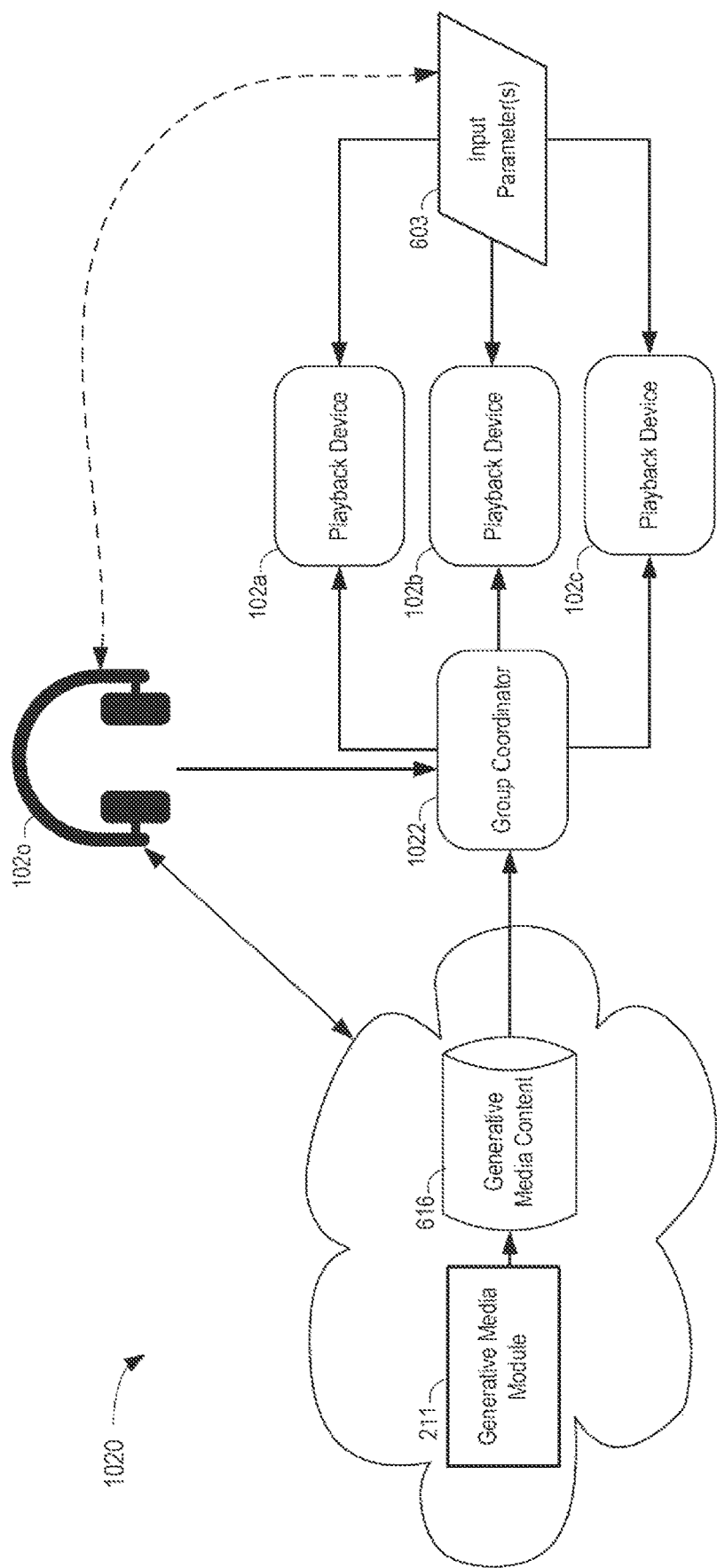
FIG. 10C is a schematic diagram of a system for producing and playing back generative media content in accordance with aspects of the disclosure.

FIG. 10C is a schematic diagram of a system 1020 for producing and playing back generative media content in accordance with aspects of the disclosure. The system 1020 can be similar to the systems 600 and 700 described above with respect to FIGS. 6 and 7, and certain components omitted in FIG. 10C can be included in various implementations. Some aspects of generative media content production are omitted, and here only the generative media module 211 and the resulting generative media content 616 are illustrated. However, in various embodiments, any of the approaches or techniques described elsewhere herein or otherwise known to one of skill in the art can be incorporated in the production of generative media content 616

In various examples, the generative media content 616 can include multi-channel media content. The generative media content 616 may then be transmitted either to the wearable playback device 102*o* and/or to a group coordinator 1022 for playback via out-loud playback devices 102*a*, 102*b*, and 102*c*. In the event of a swap action, the generative media content 616 being played back via the wearable playback device 102*o* can be swapped to the group coordinator 1022 such that play back via the wearable playback device 102*o* ceases and playback via the out-loud playback devices 102*a*-102*c* begins. The converse swap may also be performed, in which out-loud generative audio content ceases being played back via the out-loud playback devices 102*a*-*c* and begins being played back via the wearable playback device 102*o*.

In some instances, the wearable playback device 102*o* may include its own on-board generative media module 211, and swapping playback from the wearable playback device 102*o* to the out-loud playback devices involves transmitting the generative audio content produced via the wearable playback device 102*o* from the wearable playback device 102*o* to the group coordinator 1022.

In some examples, swapping to a set of target out-loud playback devices comprises transmitting details or parameters of the generative media module to the target group coordinator 1022. In other examples, the wearable device 102*i* receives generative audio from a cloud-based generative media module, and swapping audio from the wearable device 102*o* to the target devices 102*a*-*c* involves the target group coordinator 1022 requesting generative media content from the cloud-based generative media module 211.

Some or all of the playback devices 102 can be configured to receive one or more input parameters 603. As noted previously, the input parameters 603 can include any suitable inputs, such as user inputs (e.g., user selection via a controller device), sensor data (e.g., number of people present in a room, background noise levels, time of day, weather data, etc.), or other suitable input parameter. In various examples, the input parameter(s) 603 can optionally be provided to the playback devices 102, and/or may be detected or determined by the playback devices 102 themselves.

In some examples, to determine the particular playback responsibilities, and to coordinate synchronous playback between the various devices, the group coordinator 1022 can transmit timing and/or playback responsibility information to the playback devices 102. Additionally or alternatively, the playback devices 102 themselves may determine their respective playback responsibilities based on the received multi-channel media content along with the input parameters 603.

Figure 10D:
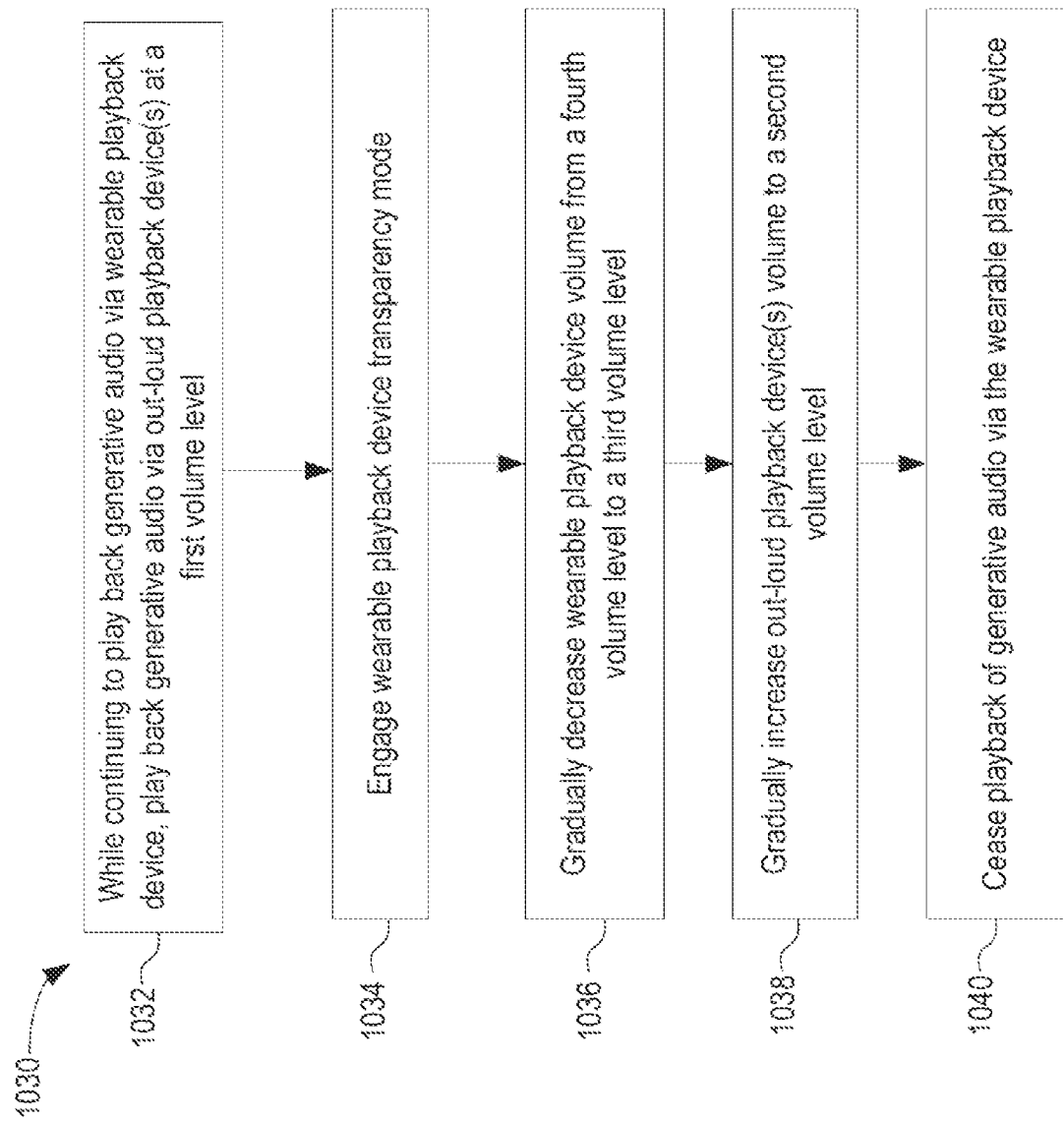
FIG. 10D illustrates an example method of playing back generative audio via both wearable and out-loud playback devices in accordance with aspects of the disclosure.

FIG. 10D illustrates an example method 1030 for playing back generative audio content via both wearable and out-loud playback devices. At block 1032, the method 1030 involves, while continuing to play back generative audio via a wearable playback device, playing back generative audio via out-loud playback device(s) at a first volume level, which may be lower than an ultimate second volume level that has not yet been reached. The wearable playback device can engage a transparency mode in block 1034, and at block 1036, the wearable playback device volume is gradually reduced from a fourth volume level to a third volume level that is less than the fourth. For example, the fourth volume level can be the current playback volume, and the third volume level can be an intermediate volume level between the fourth volume level and mute.

Block 1038 involves gradually increasing playback volume of the out-loud playback device(s) from the first volume level to the second volume level that is greater than the first. And in block 1040, playback of the generative audio content via the wearable playback device ceases altogether. In various examples, gradually decreasing playback volume of the wearable playback device can occur concurrently with gradually increasing playback volume of the out-loud playback devices.

In some examples, while in the transparency mode (block 1034), audio played back via the wearable playback device can be modified to reduce the amount of audio played back within frequency bands associated with human speech. This can enable the user to hear speech even while audio is being played back via the wearable playback device. Additionally or alternatively, any active noise cancellation functionality may be reduced or turned off completely while in transparency mode.

d. Rules Engines for Restricting Generative Media Playback

Figure 11:
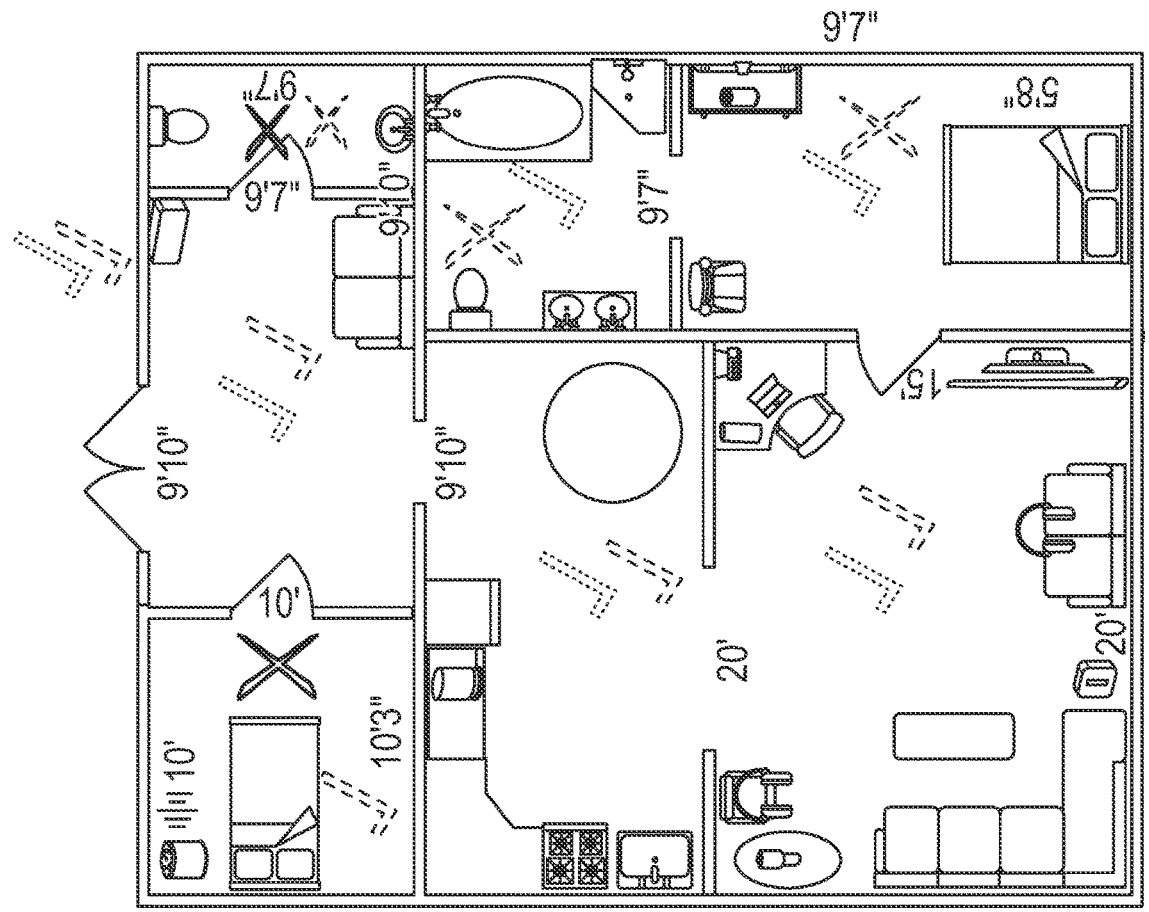
FIG. 11 illustrates an example rules engine for restricting playback of generative audio within an environment in accordance with aspects of the disclosure.

In some instances, it may be desirable to provide user-level and/or location-level restrictions on playback of soundscapes or other audio content. FIG. 11 illustrates an example rules engine for restricting playback of generative audio content within an environment. As illustrated, there may be location restrictions that can vary by user. In this example, User 1 is permitted to play back audio content in some locations (Patio, Entry Den, Kitchen/Dining, Living, Bedroom 1, and Bath 1) but is restricted from playing back audio content in other locations (Bedroom 2, Bath 2). Similarly, User 2 is permitted to play back audio content in some locations (Patio, Bedroom 2, Entry Den, Kitchen/Dining, Living) but is restricted from playing back audio content in other locations (Bath 2, Bedroom 1, Bath 1). Such restrictions can be based on user preferences, device capabilities, user characteristics (e.g., age), and can prohibit users from playing back soundscapes or other audio in certain zones or rooms within an environment or household.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

The various methods disclosed herein can be implemented by any of the devices described herein, or any other devices now known or later developed. The various methods described herein can include one or more operations, functions, or actions illustrated by blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the methods disclosed herein, the flowcharts show functionality and operation of possible implementations of some examples. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random-Access Memory (RAM). The computer readable medium may also include non-transitory media, such as secondary or persistent long-term storage, like read only memory (ROM), optical or magnetic disks, compact disc read only memory (CD-ROM), for example. The computer readable media may also be any other volatile or non-volatile storage systems. The computer readable medium may be considered a computer readable storage medium, for example, or a tangible storage device. In addition, for the methods and for other processes and methods disclosed herein, each block in the figures may represent circuitry that is wired to perform the specific logical functions in the process.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Examples

The disclosed technology is illustrated, for example, according to various examples described below. Various examples of examples of the disclosed technology are described as numbered examples for convenience. These are provided as examples and do not limit the disclosed technology. It is noted that any of the dependent examples may be combined in any combination, and placed into a respective independent example. The other examples can be presented in a similar manner.

Example 1: A wearable playback device comprising: one or more audio transducers; a network interface; one or more processors; and one or more tangible, non-transitory computer-readable media storing instructions that, when executed by the one or more processors, cause the wearable playback device to perform operations comprising: detecting that the wearable playback device is being worn by a user; obtaining one or more input parameters via the network interface of the wearable playback device; after detecting that the wearable playback device is being worn by the user, causing generative media content to be generated based at least in part on the one or more input parameters; playing back, via the one or more audio transducers, the generative media content; detecting that the wearable playback device is no longer being worn by the user; and after detecting that the wearable playback device is no longer being worn by the user, ceasing playback of the generative media content via the one or more audio transducers.

Example 2. The wearable playback device of any one of the Examples herein, wherein the one or more input parameters comprises location information, and wherein as the location information changes over time, the generative media content changes based at least in part on the changing location information.

Example 3. The wearable playback device of any one of the Examples herein, wherein the location information comprises identification of rooms or spaces within the user's environment.

Example 4. The wearable playback device of any one of the Examples herein, wherein the one or more input parameters comprises user identity information.

Example 5. The wearable playback device of any one of the Examples herein, wherein causing the generative media content to be created comprises (i) transmitting, via the network interface of the wearable playback device, at least one of the one or more input parameters to a second playback device, and (ii) receiving, via the network interface of the wearable playback device, generative media content generated via the second playback device.

Example 6. The wearable playback device of any one of the Examples herein, wherein the one or more input parameters comprise one or more first input parameters, and wherein causing the generative media content to be created comprises receiving, via the network interface of the wearable playback device from a network interface of a second playback device, at least one second input parameter.

Example 4. The wearable playback device of any one of the Examples herein, wherein the one or more input parameters comprises sound data obtained via a microphone of the wearable playback device.

Example 8. The wearable playback device of any one of the Examples herein, wherein the sound data comprises a seed for a generative media content engine.

Example 9. The wearable playback device of any one of the Examples herein, wherein the operations further comprise, concurrently with playing back the generative media content, causing one or more light sources in the user's environment to be adjusted (on/off, change colors, etc.) based at least in part on the one or more input parameters.

Example 10. The wearable playback device of any one of the Examples herein, wherein the one or more input parameters comprises spatial calibration information for a location of the user, and wherein playing back the generative media content comprises playing back audio via the wearable playback device using the spatial calibration information.

Example 11. The wearable playback device of any one of the Examples herein, wherein the operations further comprise, while playing back the generative media content via the wearable playback device, initiating synchronous playback of at least a portion of the generative media content via a second audio playback device.

Example 12. The wearable playback device of any one of the Examples herein, wherein the operations further comprise, after initiating synchronous playback of the generative media content via the second audio playback device, reducing a playback volume of the wearable playback device.

Example 13. The wearable playback device of any one of the Examples herein, wherein initiating synchronous playback of the generative media content via the second audio playback device is based at least in part on a user instruction.

Example 14. The wearable playback device of any one of the Examples herein, wherein initiating synchronous playback of the generative media content via the second audio playback device is based at least in part on a proximity determination between the wearable playback device and the second audio playback device.

Example 15. The wearable playback device of any one of the Examples herein, wherein the operations further comprise: while playing back the generative media content via the wearable playback device, detecting a wireless audio source connection; and after detecting the wireless audio source connection, ceasing playback of the generative media content and initiating playback of audio data from the wireless audio source.

Example 16. The wearable playback device of any one of the Examples herein, wherein the operations further comprise: determining that the wireless audio source is disconnected; and after determining that the wireless audio source is disconnected, initiating playback of the generative media content.

Example 17. The wearable playback device of any one of the Examples herein, wherein generative media content is based at least in part on the audio data from the wireless audio source.

Example 18. The wearable playback device of any one of the Examples herein, wherein the one or more input parameters comprise one or more of: physiological sensor data (e.g., biometric sensors, wearable sensors (heart rate, temperature, breathing rate, brainwave)); networked device sensor data (e.g., cameras, lights, temperature sensors, thermostats, presence detectors, microphones); environmental data (e.g., weather, temperature, time/day/week/month); wearable playback device capability data (e.g., number and type of transducers, output power); wearable playback device state (e.g., device temperature, battery level, current audio playback, playback device location, whether playback device is bonded with another playback device); or user data (e.g., user identity, number of users present, user location, user history data, user preference data, user biometric data (heart rate, temperature, breathing rate, brain activity, voice utterance characteristics), user mood data).

Example 19. A method comprising: detecting that a wearable playback device is being worn by a user; obtaining one or more input parameters via a network interface of the wearable playback device; after detecting that the wearable playback device is being worn by the user, causing generative media content to be generated based at least in part on the one or more input parameters; playing back, via the wearable playback device, the generative media content; detecting that the wearable playback device is no longer being worn by the user; and after detecting that the wearable playback device is no longer being worn by the user, ceasing playback of the generative media content via the wearable playback device.

Example 20. The method of any one of the Examples herein, wherein the one or more input parameters comprises location information, and wherein as the location information changes over time, the generative media content changes based at least in part on the changing location information.

Example 21. The method of any one of the Examples herein, wherein the location information comprises identification of rooms or spaces within the user's environment.

Example 22. The method of any one of the Examples herein, wherein the one or more input parameters comprises user identity information.

Example 23. The method of any one of the Examples herein, wherein causing the generative media content to be created comprises (i) transmitting, via the network interface of the wearable playback device, at least one of the one or more input parameters to a second playback device, (ii) receiving, via the network interface of the wearable playback device, generative media content generated via the second playback device.

Example 24. The method of any one of the Examples herein, wherein the one or more input parameters comprise one or more first input parameters, and wherein causing the generative media content to be created comprises receiving, via the network interface of the wearable playback device from a network interface of a second playback device, at least one second input parameter.

Example 25. The method of any one of the Examples herein, wherein the one or more input parameters comprises sound data obtained via a microphone of the wearable playback device.

Example 26. The method of any one of the Examples herein, wherein the sound data comprises a seed for a generative media content engine.

Example 27. The method of any one of the Examples herein, further comprising, concurrently with playing back the generative media content, causing one or more light sources in the user's environment to be adjusted (on/off, change colors, etc.) based at least in part on the one or more input parameters.

Example 28. The method of any one of the Examples herein, wherein the one or more input parameters comprises spatial calibration information for a location of the user, and wherein playing back the generative media content comprises playing back audio via the wearable playback device using the spatial calibration information.

Example 29. The method of any one of the Examples herein, further comprising, while playing back the generative media content via the wearable playback device, initiating synchronous playback of at least a portion of the generative media content via a second audio playback device.

Example 30. The method of any one of the Examples herein, further comprising, after initiating synchronous playback of the generative media content via the second audio playback device, reducing a playback volume of the wearable playback device.

Example 31. The method of any one of the Examples herein, wherein initiating synchronous playback of the generative media content via the second audio playback device is based at least in part on a user instruction.

Example 32. The method of any one of the Examples herein, wherein initiating synchronous playback of the generative media content via the second audio playback device is based at least in part on a proximity determination between the wearable playback device and the second audio playback device.

Example 33. The method of any one of the Examples herein, further comprising: while playing back the generative media content via the wearable playback device, detecting a wireless audio source connection; and after detecting the wireless audio source connection, ceasing playback of the generative media content and initiating playback of audio data from the wireless audio source.

Example 34. The method of any one of the Examples herein, further comprising: determining that the wireless audio source is disconnected; and after determining that the wireless audio source is disconnected, initiating playback of the generative media content.

Example 35. The method of any one of the Examples herein, wherein generative media content is based at least in part on the audio data from the wireless audio source.

Example 36. The method of any one of the Examples herein, wherein the one or more input parameters comprise one or more of: physiological sensor data (e.g., biometric sensors, wearable sensors (heart rate, temperature, breathing rate, brainwave)); networked device sensor data (e.g., cameras, lights, temperature sensors, thermostats, presence detectors, microphones); environmental data (e.g., weather, temperature, time/day/week/month); wearable playback device capability data (e.g., number and type of transducers, output power); wearable playback device state (e.g., device temperature, battery level, current audio playback, playback device location, whether playback device is bonded with another playback device); or user data (e.g., user identity, number of users present, user location, user history data, user preference data, user biometric data (heart rate, temperature, breathing rate, brain activity, voice utterance characteristics), user mood data).

Example 37. One or more tangible, non-transitory computer-readable media storing instructions that, when executed by one or more processors of a wearable playback device, cause the wearable playback device to perform operations comprising: detecting that the wearable playback device is being worn by a user; obtaining one or more input parameters via a network interface of the wearable playback device; after detecting that the wearable playback device is being worn by the user, causing generative media content to be generated based at least in part on the one or more input parameters; playing back, via one or more audio transducers of the wearable playback device, the generative media content; detecting that the wearable playback device is no longer being worn by the user; and after detecting that the wearable playback device is no longer being worn by the user, ceasing playback of the generative media content via the one or more audio transducers.

Example 38. The one or more computer-readable media of any one of the Examples herein, wherein the one or more input parameters comprises location information, and wherein as the location information changes over time, the generative media content changes based at least in part on the changing location information.

Example 39. The one or more computer-readable media of any one of the Examples herein, wherein the location information comprises identification of rooms or spaces within the user's environment.

Example 40. The one or more computer-readable media of any one of the Examples herein, wherein the one or more input parameters comprises user identity information.

Example 41. The one or more computer-readable media of any one of the Examples herein, wherein causing the generative media content to be created comprises (i) transmitting, via the network interface of the wearable playback device, at least one of the one or more input parameters to a second playback device, and (ii) receiving, via the network interface of the wearable playback device, generative media content generated via the second playback device.

Example 42. The one or more computer-readable media of any one of the Examples herein, wherein the one or more input parameters comprise one or more first input parameters, and wherein causing the generative media content to be created comprises receiving, via the network interface of the wearable playback device from a network interface of a second playback device, at least one second input parameter.

Example 43. The one or more computer-readable media of any one of the Examples herein, wherein the one or more input parameters comprises sound data obtained via a microphone of the wearable playback device.

Example 44. The one or more computer-readable media of any one of the Examples herein, wherein the sound data comprises a seed for a generative media content engine.

Example 45. The one or more computer-readable media of any one of the Examples herein, wherein the operations further comprise, concurrently with playing back the generative media content, causing one or more light sources in the user's environment to be adjusted (on/off, change colors, etc.) based at least in part on the one or more input parameters.

Example 46. The one or more computer-readable media of any one of the Examples herein, wherein the one or more input parameters comprises spatial calibration information for a location of the user, and wherein playing back the generative media content comprises playing back audio via the wearable playback device using the spatial calibration information.

Example 47. The one or more computer-readable media of any one of the Examples herein, wherein the operations further comprise, while playing back the generative media content via the wearable playback device, initiating synchronous playback of at least a portion of the generative media content via a second audio playback device.

Example 48. The one or more computer-readable media of any one of the Examples herein, wherein the operations further comprise, after initiating synchronous playback of the generative media content via the second audio playback device, reducing a playback volume of the wearable playback device.

Example 49. The one or more computer-readable media of any one of the Examples herein, wherein initiating synchronous playback of the generative media content via the second audio playback device is based at least in part on a user instruction.

Example 50. The one or more computer-readable media of any one of the Examples herein, wherein initiating synchronous playback of the generative media content via the second audio playback device is based at least in part on a proximity determination between the wearable playback device and the second audio playback device.

Example 51. The one or more computer-readable media of any one of the Examples herein, wherein the operations further comprise: while playing back the generative media content via the wearable playback device, detecting a wireless audio source connection; and after detecting the wireless audio source connection, ceasing playback of the generative media content and initiating playback of audio data from the wireless audio source.

Example 52. The one or more computer-readable media of any one of the Examples herein, wherein the operations further comprise: determining that the wireless audio source is disconnected; and after determining that the wireless audio source is disconnected, initiating playback of the generative media content.

Example 53. The one or more computer-readable media of any one of the Examples herein, wherein generative media content is based at least in part on the audio data from the wireless audio source.

Example 54. The one or more computer-readable media of any one of the Examples herein, wherein the one or more input parameters comprise one or more of: physiological sensor data (e.g., biometric sensors, wearable sensors (heart rate, temperature, breathing rate, brainwave)); networked device sensor data (e.g., cameras, lights, temperature sensors, thermostats, presence detectors, microphones); environmental data (e.g., weather, temperature, time/day/week/month); wearable playback device capability data (e.g., number and type of transducers, output power); wearable playback device state (e.g., device temperature, battery level, current audio playback, playback device location, whether playback device is bonded with another playback device); or user data (e.g., user identity, number of users present, user location, user history data, user preference data, user biometric data (heart rate, temperature, breathing rate, brain activity, voice utterance characteristics), user mood data).

The invention claimed is:

1. A method comprising:
obtaining one or more input parameters via a network interface of a wearable playback device;
causing generative media content to be generated, by at least one network device comprising a generative media module configured to produce novel generative media content, based at least in part on the generative media module and the one or more input parameters;
after detecting that the wearable playback device is being worn by a user, playing back, via the wearable playback device, the generative media content; and
when the wearable playback device is no longer being worn by the user, ceasing playback of the generative media content via the wearable playback device.

2. The method of claim 1, wherein the one or more input parameters comprises location information, and wherein as the location information changes over time, the generative media content changes based at least in part on the changing location information.

3. The method of claim 2, wherein the location information comprises identification of rooms or spaces within the user's environment.

4. The method of claim 1, wherein the one or more input parameters comprises user identity information.

5. The method of claim 1, wherein causing the generative media content to be created comprises (i) transmitting, via the network interface of the wearable playback device, at least one of the one or more input parameters to a second playback device, (ii) receiving, via the network interface of the wearable playback device, generative media content generated via the second playback device.

6. The method of claim 1, wherein the one or more input parameters comprise one or more first input parameters, and wherein causing the generative media content to be generated comprises receiving, via the network interface of the wearable playback device from a network interface of a second playback device, at least one second input parameter.

7. The method of claim 1, wherein the one or more input parameters comprises sound data obtained via a microphone of the wearable playback device.

8. The method of claim 7, wherein the sound data comprises a seed for a generative media content engine.

9. The method of claim 1, further comprising, concurrently with playing back the generative media content, causing one or more light sources in the user's environment to be adjusted based at least in part on the one or more input parameters.

10. The method of claim 1, wherein the one or more input parameters comprises spatial calibration information for a location of the user, and wherein playing back the generative media content comprises playing back audio via the wearable playback device using the spatial calibration information.

11. The method of claim 1, further comprising, while playing back the generative media content via the wearable playback device, initiating synchronous playback of at least a portion of the generative media content via a second audio playback device.

12. The method of claim 11, further comprising, after initiating synchronous playback of the generative media content via the second audio playback device, reducing a playback volume of the wearable playback device.

13. The method of claim 11, wherein initiating synchronous playback of the generative media content via the second audio playback device is based at least in part on a user instruction.

14. The method of claim 11, wherein initiating synchronous playback of the generative media content via the second audio playback device is based at least in part on a proximity determination between the wearable playback device and the second audio playback device.

15. The method of claim 1, further comprising:
while playing back the generative media content via the wearable playback device, detecting a wireless audio source connection; and
after detecting the wireless audio source connection, ceasing playback of the generative media content and initiating playback of audio data from the wireless audio source.

16. The method of claim 15, further comprising:
determining that the wireless audio source is disconnected; and
after determining that the wireless audio source is disconnected, initiating playback of the generative media content.

17. The method of claim 15, wherein the generative media content is based at least in part on the audio data from the wireless audio source.

18. The method of claim 1, wherein the one or more input parameters comprise one or more of:
physiological sensor data;
networked device sensor data;
environmental data;
wearable playback device capability data;
wearable playback device state; or
user data.

19. One or more tangible, non-transitory computer-readable media storing instructions that, when executed by one or more processors of a wearable playback device, cause the wearable playback device to perform operations comprising:
obtaining one or more input parameters via a network interface of a wearable playback device;
causing generative media content to be generated, by at least one network device comprising a generative media module configured to produce novel generative media content based at least in part on the generative media module and the one or more input parameters;
after detecting that the wearable playback device is being worn by a user, playing back, via the wearable playback device, the generative media content; and
when the wearable playback device is no longer being worn by the user, ceasing playback of the generative media content via the wearable playback device.

20. A wearable playback device comprising:
one or more audio transducers;
a network interface;
one or more processors; and
one or more tangible, non-transitory computer-readable media storing instructions that, when executed by the one or more processors, cause the wearable playback device to perform operations comprising:
obtaining one or more input parameters via the network interface,
causing generative media content to be generated, by at least one network device comprising a generative media module configured to produce generative media content, based at least in part on the one or more input parameters,
after detecting that the wearable playback device is being worn by a user, playing back, via the wearable playback device, the generative media content, and
when the wearable playback device is no longer being worn by the user, ceasing playback of the generative media content via the wearable playback device.

21. A method comprising:
obtaining one or more input parameters via a network interface of a wearable playback device;
causing generative media content to be generated, based at least in part on the one or more input parameters;
after detecting that the wearable playback device is being worn by a user, playing back, via the wearable playback device, the generative media content;
when the wearable playback device is no longer being worn by the user, ceasing playback of the generative media content via the wearable playback device;
while playing back the generative media content via the wearable playback device, detecting a wireless audio source connection; and
after detecting the wireless audio source connection, ceasing playback of the generative media content and initiating playback of audio data from the wireless audio source.

22. The method of claim 21, further comprising:
determining that the wireless audio source is disconnected; and
after determining that the wireless audio source is disconnected, initiating playback of the generative media content.

23. The method of claim 21, wherein the generative media content is based at least in part on the audio data from the wireless audio source.

* * * * *

UNITED STATES PATENT AND TRADEMARK OFFICE
CERTIFICATE OF CORRECTION

PATENT NO. : 12,175,161 B2
APPLICATION NO. : 18/636089
DATED : December 24, 2024
INVENTOR(S) : Wilberding et al.

Page 1 of 1

It is certified that error appears in the above-identified patent and that said Letters Patent is hereby corrected as shown below:

In the Claims

In Column 43, in Claim 19, Line 37, delete "content" and insert -- content, --, therefor.

Signed and Sealed this
Twenty-eighth Day of January, 2025

Coke Morgan Stewart
*Acting Director of the United States Patent and Trademark Office*